United States Patent [19]

Swanchara et al.

[11] Patent Number: 6,108,542
[45] Date of Patent: Aug. 22, 2000

[54] METHOD AND ARRANGEMENT IN A ROAD COMMUNICATION NETWORK

[75] Inventors: Anthony Swanchara, Apex, N.C.; Lars Peter Künkel, Landskrona; Richard W. Peck, Lund, both of Sweden

[73] Assignee: Telefonaktiebolaget LM Ericsson

[21] Appl. No.: 09/007,054

[22] Filed: Jan. 14, 1998

[30] Foreign Application Priority Data

Oct. 20, 1997 [SE] Sweden ................................. 9703817

[51] Int. Cl.[7] ...................................................... H04Q 7/20
[52] U.S. Cl. ............................................ 455/434; 455/515
[58] Field of Search .................................. 455/434, 515, 455/574, 343, 38.2, 38.3

[56] References Cited

U.S. PATENT DOCUMENTS

| | | | |
|---|---|---|---|
| 5,119,397 | 6/1992 | Dahlin et al. ................................. | 375/5 |
| 5,224,152 | 6/1993 | Harte ........................................... | 379/59 |
| 5,260,988 | 11/1993 | Schellinger et al. . | |
| 5,504,803 | 4/1996 | Yamada et al. . | |
| 5,533,014 | 7/1996 | Willars et al. . | |
| 5,541,929 | 7/1996 | Jokura . | |
| 5,566,357 | 10/1996 | Holcman . | |
| 5,568,513 | 10/1996 | Croft et al. . | |
| 5,613,208 | 3/1997 | Blackman et al. . | |
| 5,699,408 | 12/1997 | Krolopp et al. ............................ | 375/59 |
| 5,918,170 | 1/1999 | Oksanen et al. .......................... | 455/343 |
| 5,940,746 | 8/1999 | Otting et al. .............................. | 455/161.3 |

FOREIGN PATENT DOCUMENTS

| | | |
|---|---|---|
| 0 656 735 | 6/1995 | European Pat. Off. . |
| 0 674 454 | 9/1995 | European Pat. Off. . |
| 94/00946 | 1/1994 | WIPO . |
| 98/09461 | 3/1998 | WIPO . |
| 98/12887 | 3/1998 | WIPO . |

*Primary Examiner*—Reinhard J. Eisenzopf
*Assistant Examiner*—Naghmeh Mehrpour
*Attorney, Agent, or Firm*—Burns, Doane, Swecker & Mathis, L.L.P.

[57] ABSTRACT

The present invention is related to a method and arrangement in a mobile station operating in standby mode and monitoring a first control channel in a first radio communication network. The transmission of messages (703–708) on the first control channel occurs in periodic occuring frames (700). Each frame (700) comprises a first sequence of messages (701), in which no message is addressed to a specific mobile station, and a second sequence of messages (702) that may comprise messages addressed to specific mobile stations. The mobile station determines for at least a first frame (700) a time period during which no part of a message, belonging to the second sequence of messages (702), will be transmitted. Said time period is used by the mobile station to perform actions other than receiving radio signals carrying the first control channel, e.g. entering sleep mode or scanning for control channels in a second radio communication network.

34 Claims, 22 Drawing Sheets

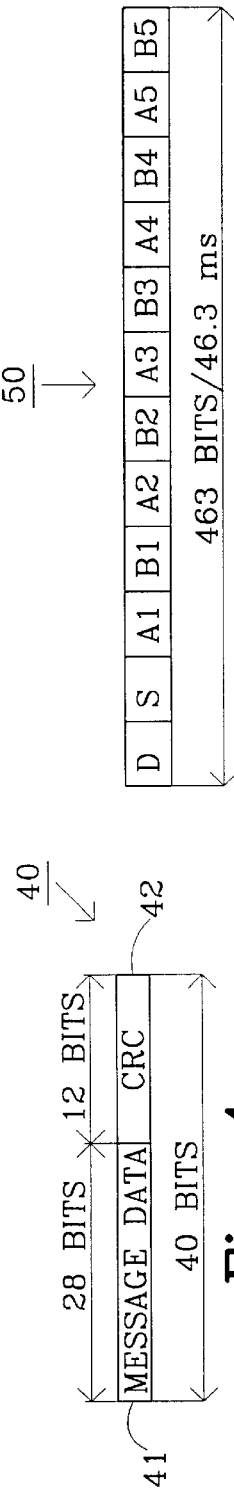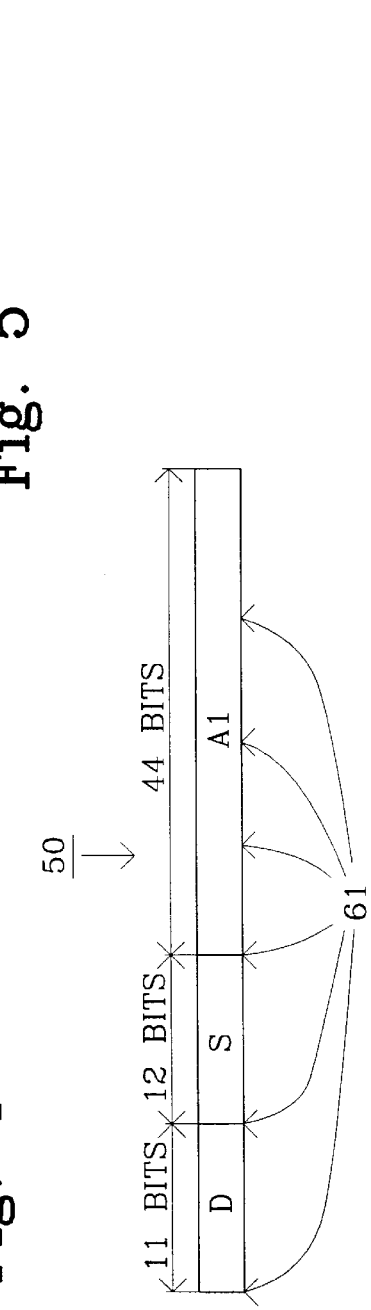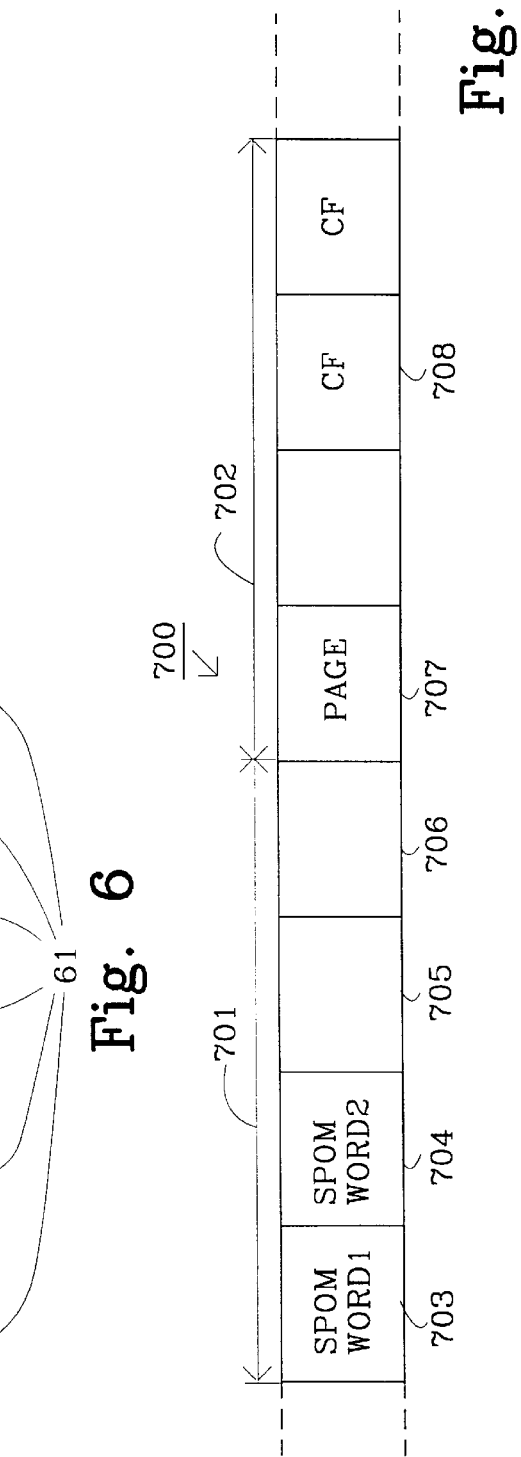

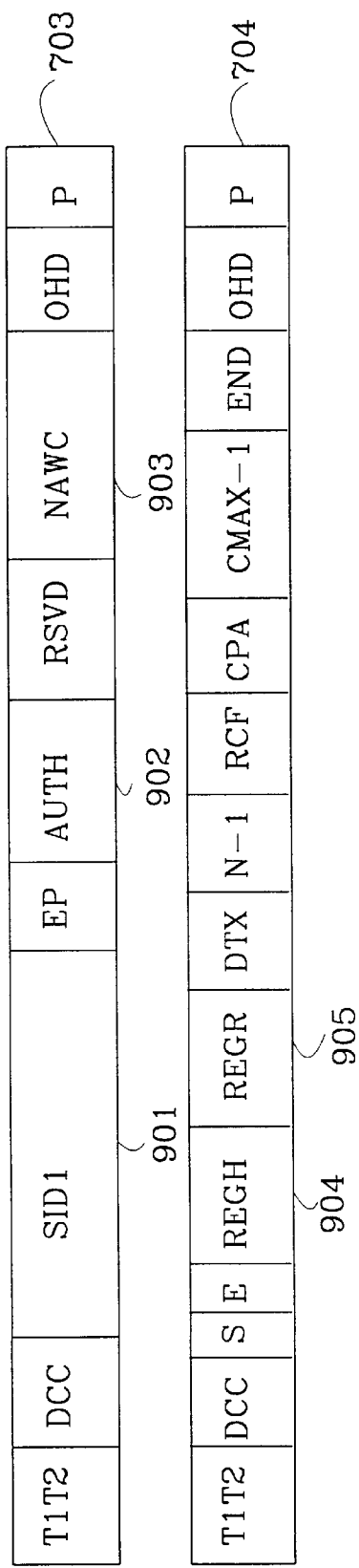
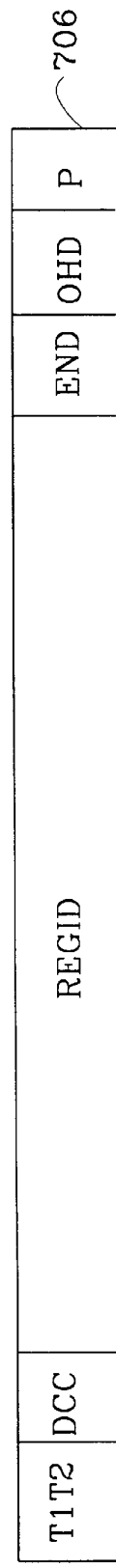
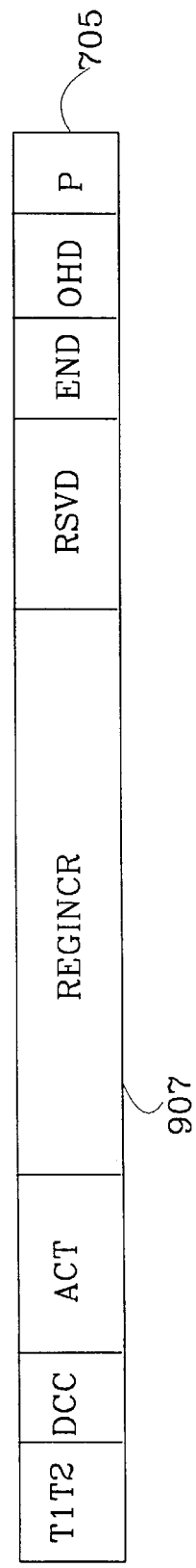
Fig. 9A
Fig. 9B
Fig. 9c

METHOD AND ARRANGEMENT IN A ROAD COMMUNICATION NETWORK

This application claims priority under 35 U.S.C. §§119 and/or 365 to SE 9703817-8 filed in Sweden on Oct. 20, 1997; the entire content of which is hereby incorporated by reference.

TECHNICAL FIELD OF THE INVENTION

The invention relates to a method and an arrangement in a communication network. More precisely the invention relates to a method and an arrangement for scheduling operation of a mobile station operating in standby mode in a radio communication network.

DESCRIPTION OF RELATED ART

A mobile station in standby mode (idle mode), i.e. when neither originating or receiving a call, is monitoring a control channel in a serving cell of a first cellular network for the purpose of receiving system information and paging messages.

While in standby mode and thus monitoring the control channel of the serving cell, there is often also a need for the mobile station to scan for other radio channels. There may be several different reasons for performing channel scanning e.g. finding a control channel in the first network having superior signal quality or finding a control channel of a second preferred network.

In networks using time division multiple access (TDMA) technology, e.g. networks according to the GSM or PDC standards, each control channel is only allocated certain time slots. Some of the remaining time slots may be used by the mobile station for channel scanning. As an example, a GSM mobile station operating in a visited network uses some of the remaining time slots to scan for both control channels of the visited network having superior signal quality as well as control channels of a home network.

In many other networks using other technologies than TDMA, e.g. Frequency Division Multiple Access (FDMA) or Code Division Multiple Access (CDMA), the control channel information is transmitted continuously without any time gaps. Examples of such networks are networks according to the AMPS, TACS or NMT standards. Since the control channel information is transmitted continuously the mobile station is at all times busy monitoring the control channel of the serving cell and hence there is no free time available to scan for other radio channels. The basic problem is that if the mobile station were to scan for other radio channels during certain time intervals, the mobile station runs the risk of missing paging messages indicating incoming calls to the mobile station.

Another problem associated with having to continously monitor the control channel of the serving cell is that this mode of operation consumes power.

U.S. Pat. No. 5,260,988 describes a dual mode cellular cordless portable radiotelephone. The radiotelephone preferentially selects to operate in a cordless system over a cellular network. When the radiotelephone is operating in the cellular network, the radiotelephone scans for a radio channel associated with the cordless system. When said radio channel is detected, the radiotelephone changes its mode of operation and starts operating in the cordless system. When operating in the cellular network, the radiotelephone must monitor a control channel for page messages indicating an incoming call. Each page message is repeated. The radiotelephone schedules the scanning for radio channels in a way that ensures the radiotelephone never misses an incoming call because it was scanning for radio channels during both page messages transmission times. The scheduling is done by determining two fixed time periods, one for monitoring the control channel and one for channel scanning, having a special relationship derived from the time between the two page messages and the time needed to transmit one page message.

A disadvantage of the described way of scheduling channel scanning is that there is an increased risk that an incoming call will not be detected by the radiotelephone since the radiotelephone only monitors the control channel when one of the two page messages are transmitted. A further complication of the channel scanning method disclosed in U.S. Pat. No. 5,260,988 is that the two time periods both depend on the time between the two transmissions of a page message. The time period used for scanning must be less than the time between the two transmissions of a page message. The time period used for monitoring between each scanning period must be greater than the sum of the time between the two transmissions and the typical time to transmit two page messages. The AMPS standard does not explicitly specify that page messages should be repeated and consequently the standard does not specify said time between the two transmissions. These issues are thus left at the discretion of each network operator. Hence, it becomes very difficult to determine said time periods to ensure that the channel scanning method will work as intended in different networks and at the same time will provide a reasonable amount of time available for scanning.

U.S. Pat. No. 5,613,208 describes a channel scanning method for use in a cellular network. The method involves transmitting from a base station a control signal to at least one mobile station for informing them that no pages will be issued for a predetermined time period. Upon receipt of said control signal the mobile station scans for radio channels in the network having superior characteristics during said time period. If such a channel is found, the channel number is stored in the mobile station for later use.

This channel scanning method requires that there is a special control signal (message), e.g. the battery saving order message in networks of the NMT type, indicating the time during which no pages will be issued and the method can thus only be used in networks where such a special message is transmitted.

U.S. Pat. No. 5,568,513 describes a method for reducing standby power consumption of a mobile station. The method involves receiving messages in a mobile station from a base station. The messages comprises repeated blocks of information bits, each block having a number of data bits and check bits whose value depends on the data bits. Check indication is generated when the data bits and check bits are consistent with each other. When a check indication is generated, portions of the mobile station are turned off until receipt of a next block of non redundant information is expected. The described method is solely directed to the problem of reducing standby power consumption in the mobile station.

U.S. Pat. No. 5,566,357 teaches another method for reducing standby power consumption of a mobile station. The mobile, station comprises a processor and a filter. The processor is put in sleep mode to conserve power. All received messages are screened by the filter. When a received message requires further processing, the filter interrupts the processor and passes the received message to the processor for further processing. All other messages are ignored.

The preferred embodiment of the method does not provide for filtering the overhead messages since that would require a more complex process and the additional power saving from filtering these messages is considered as negligible.

In the described method all messages are received by the mobile station, i.e. the method does not enable the mobile station to conserve power by turning off its radio receiver.

SUMMARY OF THE INVENTION

The problem dealt with by the present invention is enabling a mobile station, operating in standby mode and monitoring a first control channel in a first radio communication network, to temporarily stop monitoring the control channel to perform other actions without risk of missing incoming calls for the mobile station.

The problem is solved essentially by a method implemented in the mobile station in which the mobile station dynamically determines a time period during which no message addressed to a specific mobile station will be transmitted. Said time period is then used by the mobile station to perform actions other than receiving radio signals carrying the first control channel. The problem solution includes the necessary means for implementing the method in the mobile station.

More specifically, the problem is solved in the following manner. The transmission of messages on the first control channel occurs in periodic occuring frames. Each frame comprises a first sequence of messages, in which no message is addressed to a specific mobile station and a second sequence of messages, which may comprise messages addressed to specific mobile stations. The mobile station determines for at least a first frame a time period during which no part of a message, belonging to the second sequence of messages, will be transmitted. Said time period is then used by the mobile station to perform actions other than receiving radio signals carrying the first control channel.

According to different embodiments of the invention, said actions other than receiving radio signals carrying the first control channel comprises turning off portions of the mobile station, scanning for control channels transmitted by other base stations in said first radio communication network or in a different radio communication network.

A general intention of the invention is to provide a method and an arrangement enabling a mobile station, operating in standby mode and monitoring a first control channel in a first radio communication network, to temporarily stop monitoring the control channel to perform other actions without risk of missing incoming calls for the mobile station.

Another intention is to provide a method and an arrangement for enabling the mobile station to stop monitoring the control channel to perform other actions that further do not require the transmission of any special messages to the mobile station with an explicit indication of a time period during which no page messages will be transmitted to the mobile station.

One advantage afforded by the invention is that the mobile station may, while operating in standby mode and monitoring a first control channel in a first radio communication network, temporarily stop monitoring the control channel to perform other actions without risk of missing incoming calls for the mobile station.

Another advantage is that the invention does not require the transmission of a special message with an explicit indication of a time period during which no page messages will be transmitted to the mobile station.

The invention will now be described in more detail with reference to exemplifying embodiments thereof and also with reference to the accompanying drawings.

BRIEF DESCRIPTION OF THE DRAWINGS

FIG. 4 is a block diagram illustrating the bit structure of an AMPS control word, as transmitted from a base station to mobile stations on a Forward Control Channel.

FIG. 5 is a block diagram illustrating the structure of an AMPS word block, as transmitted from a base station to mobile stations on a Forward Control Channel.

FIG. 6 is a block diagram illustrating how busy-idle bits are inserted in the AMPS Forward Control Channel word block structure.

FIG. 7 is a block diagram illustrating the frame structure on a logical stream of a AMPS Forward Control Channel.

FIGS. 9A–9C are block diagrams illustrating the structure of some overhead messages.

DETAILED DESCRIPTION OF THE EMBODIMENTS

Figure 1:
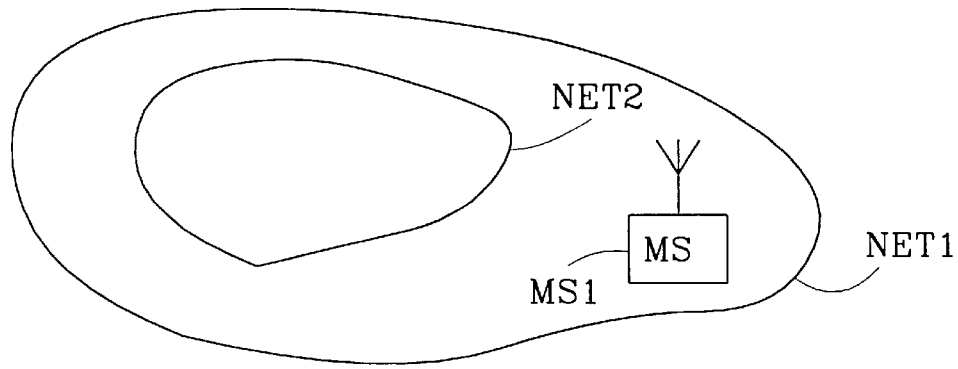
FIG. 1 is a view illustrating different coverage areas provided by two networks in a radio communication system.

FIG. 1 offers an example of a radio communication system comprising a first and a second radio communication network NET1 respective NET2. The radio coverage provided by the first and the second radio communication network NET1 respective NET2 differs. In this example the geographic area where the first network NET1 provides radio coverage includes the complete area where the second network NET2 provides coverage as well as some additional area. A person skilled in the art realises that there are several different ways that the radio coverage provided by two different networks NET1–NET2 might be related. FIG. 1 illustrates the typical initial situation when deploying a new network NET2 in an area with an already existing network NET1, e.g. when deploying a PCS1900 network in an area with an existing AMPS network. For the time being we will assume that the first radio communication network NET1 is of AMPS type while the second radio communication network NET2 is of PCS1900 type (i.e. GSM based PCS).

The PCS1900 network NET2 offers an increased range of services and features as compared to the AMPS network NET1. However, the AMPS network NET1 offers a more extensive area of radio coverage. A dual mode PCS1900/AMPS mobile station MS1 enables a person wanting to primarily buy services from the PCS1900 network operator to access the PCS1900 network services in the coverage area provided by the PCS1900 network NET2 while at the same time getting less extensive communication services outside this coverage area by accessing the AMPS network services in the coverage area provided by the AMPS network NET1.

Figure 2:
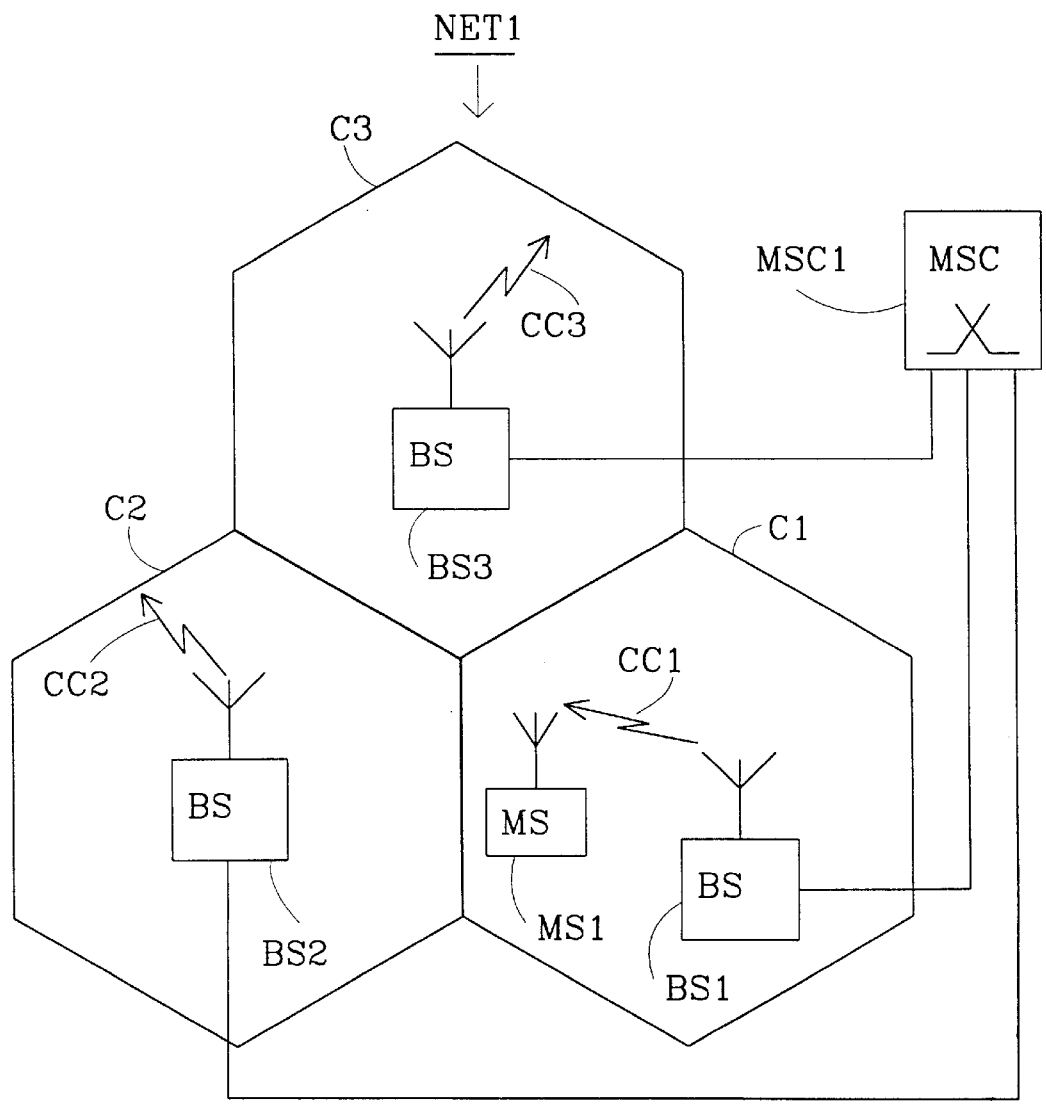
FIG. 2 is a view illustrating a portion of a cellular network.

FIG. 2 illustrates how radio coverage is provided in a cellular network. FIG. 2 shows a part of the AMPS network NET1. The geographic area covered by the network NET1 is divided into cells C1–C3. Each cell C1–C3 provides radio coverage in a certain area and is allocated a certain set of frequencies for communication in that area. Each cell C1–C3 is served by one base station BS1–BS3 with means for transmitting to and receiving from mobile stations currently located in the cell. In FIG. 2, the PCS1900/AMPS dual mode mobile station MS1 is located in cell C1. The base stations BS1–BS3 are connected to a mobile services switching centre (MSC) MSC1. The mobile services switching centre MSC1 is responsible for switching calls to and from mobile stations located in the area served by the mobile services switching centre MSC1.

In each cell C1–C3 the base station BS1–BS3 serving that cell transmits messages with control information on a control channel CC1–CC3 to mobile stations located in the cell. This control information comprises different kinds of system information as well as messages destined to specific mobile stations, including paging messages indicating an incoming call for a mobile station. The control channel is, in general, regarded as being bidirectional, enabling mobile stations to transmit messages with control information to the base stations. In AMPS terminology the control channel in the direction from the base station is called a Forward Control Channel (FOCC), while the control channel in the direction from the mobile station is called a Reverse Control Channel (RECC). However, when describing the invention at hand it is only the FOCC part of the control channel that is of importance and unless otherwise stated when the term control channel is used in the context of an AMPS network this implies the FOCC.

As is well known to a person skilled in the art, a PCS1900 network has a structure that is very similar to what is shown in FIG. 2 and we will not discuss the minor differences in network structure. The equivalence of the AMPS FOCC in a PCS1900 network consists of a grouping of so called logical channels. This grouping of control channels comprises a Frequency Correction Channel (FCCH), a Synchronization Channel (SCH), a Common Control Channel (CCCH) and a Broadcast Control Channel (BCCH) all mapped onto timeslot zero of a radio channel called a BCCH carrier. In the context of a PCS1900 network, we will use the term control channel to refer to either the BCCH carrier or said combination of logical channels.

Figure 3:
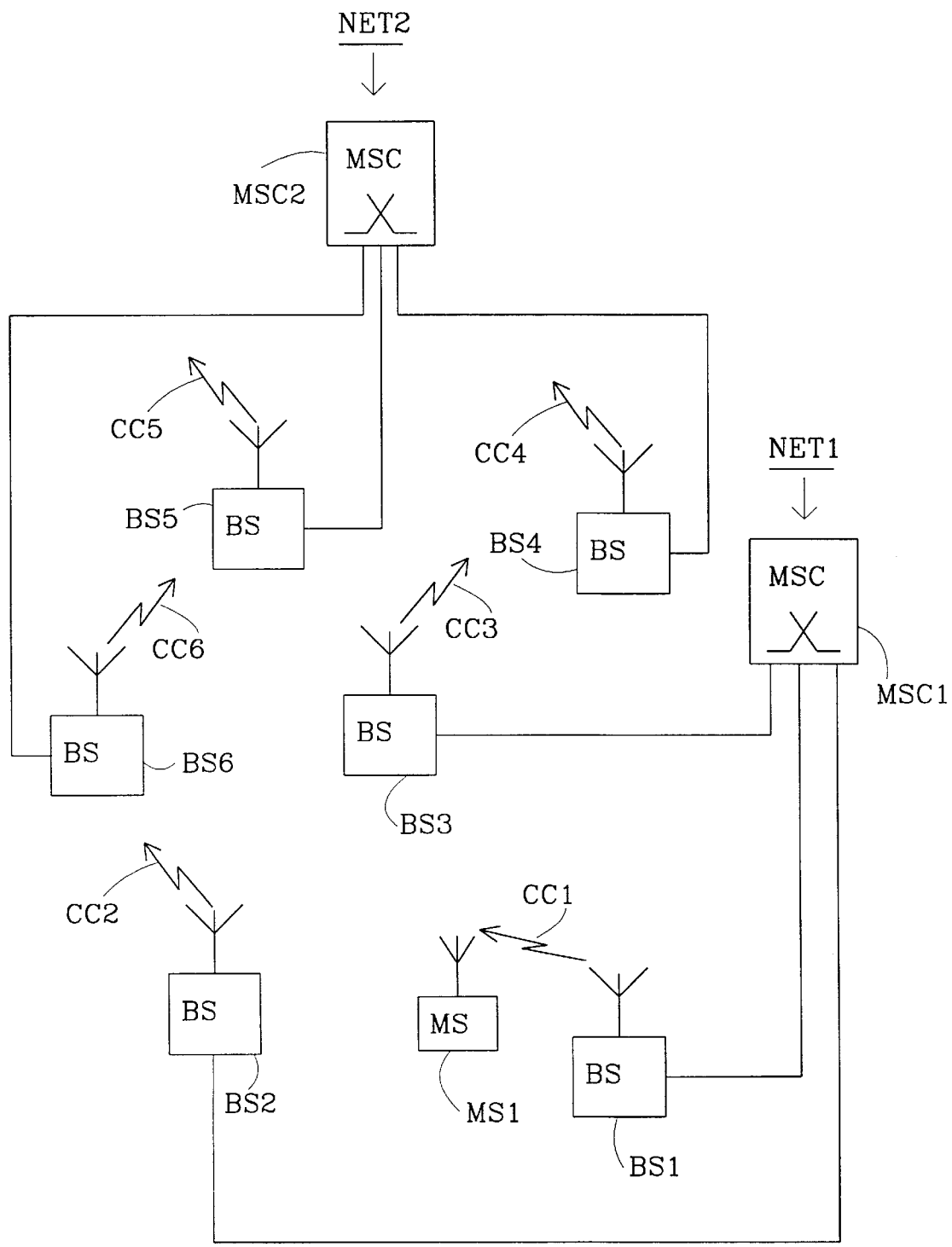
FIG. 3 is a view illustrating portions of both networks from FIG. 1.

FIG. 3 illustrates how radio base stations BS1–BS3 in the AMPS network NET1 as well as radio base stations BS4–BS6 in the PCS1900 network NET2 transmits control channels CC1–CC6. The control channels CC1–CC3 are all AMPS Forward Control Channels while the control channels CC4–CC6 comprises said grouping of PCS1900 logical channels. When the mobile station MS1 is operating in standby mode in the AMPS network it is monitoring one of the control channels CC1–CC3 transmitted by one of the base stations BS1–BS3 in the AMPS network for system information and page messages. Similarly when the mobile station MS1 is operating in standby mode in the PCS1900 network is monitoring one of the control channels CC4–CC6 transmitted by one of the base stations BS4–BS6 in the PCS1900 network for the corresponding type of information.

Since the person using the mobile station MS1 in this example primarily wants to access the PCS1900 network services, the mobile station MS1 needs to be able to detect when it has moved into an area where the PCS1900 network NET2 provides radio coverage. This implies that the mobile station MS1, while operating in standby mode in the AMPS network NET1 and monitoring one of the control channels CC1–CC3, e.g. CC1, in said network, needs to be able to scan for the control channels CC4–CC6 in the PCS1900 network NET2. Scanning for the PCS1900 network control channels CC4–CC6 must be carried out in a way that ensures that the mobile station MS1 still will be able to detect incoming calls, i.e. that the mobile station MS1 receives page messages transmitted on the monitored AMPS control channel CC1.

FIG. 4 to FIG. 7 illustrates the structure of the FOCC information flow on each of the Forward Control Channels CC1–CC3 in the AMPS network NET1.

FIG. 4 shows the structure of one 40-bit FOCC word 40, i.e. block of information bits, comprising 28 message data bits 41 and 12 CRC check bits 42 according to the EIA/TIA-553 cellular standard, i.e. the AMPS standard. The CRC code 42, whose value depends on the data bits 41, provides powerful error detection capability and optionally the ability to correct any single-bit error in the 28 message bits 41.

FIG. 5 shows the structure of one word block 50, according to EIA/TIA-553. Each word block 50 conveys five repeats A1, A2, . . . A5 of a first 40-bit word "A" and five repeats B1, B2 . . . B5 of a second 40-bit word "B". The A and B words belong to independent message streams intended for mobile stations having even and odd Mobile Identification Numbers (MIN) respectively. The sequence of A words in each word block comprises a logical stream A, while the sequence of B words in each word block comprises a logical stream B.

FIG. 6 shows more detail of the preamble bit-blocks labeled D and S in FIG. 5. The "dotting sequence" D is a 10-bit block of alternating 1's and 0's intended to provide the receiver with symbol resynchronization opportunities. Symbols are transmitted using Manchester NRZ code. In the EIA/TIA-553 cellular standard, the bit rate is 10 kb/s. The Manchester coded bits are transmitted using frequency modulation of a radio carrier. Preceding the 10-bit dotting sequence is a single bit busy/idle flag 61, giving the total 11 bits labeled "D" in FIG. 5 and FIG. 6.

Following the dotting sequence D is an 11-bit sync word also preceded by a busy/idle flag 61, making the 12 bits labeled "S" in FIG. 5 and FIG. 6. This is followed by five repeats each of two 40-bit words designated A and B. Four extra busy/idle bits 61 are inserted in each word repeat making 44-bit blocks, as shown in FIG. 6. The total number of bits in a word block 50 is thus 1+10+1+11+2×5×(40+4)= 463 bits.

The control words convey different types of messages. Each message comprises at least one word. The messages are divided into three different categories, mobile station control messages, overhead messages and control filler messages. Mobile station control messages, are addressed (by MIN) to specific mobile stations. An example of a mobile station control message is page.

Overhead messages, also called global messages, are not addressed to specific mobile stations but rather destined to all mobile stations being tuned to the FOCC.

Control filler messages may be inserted at any time in the FOCC stream. A control filler message is transmitted whenever there is no other message to be sent on the FOCC, so to maintain a synchronous 10 kbit/s data stream.

FIG. 7 illustrates how transmission of messages on one logical stream on the FOCC can be considered as organized into periodic occuring frames 700. Note that messages of potential concern to a specific mobile station are all sent on the same logical stream.

Overhead messages are transmitted on the logical stream approximately every 0.8 second. They are transmitted in a block of messages, known as an overhead message train (OMT) 701. The continuity of this block may be interrupted only by control filler messages. The number of overhead message words in this block is known after the first one has been received, and each train begins with a two word system parameter overhead message (SPOM) 703–704. Additional overhead messages, e.g. a registration increment global action message 705 and a registration ID message 706, can be appended to the overhead message train. The messages added to each overhead message train will vary over time. These appended messages provide for network management, mobile station system access parameters, authentication parameters and periodic registration control. Since the network is dynamic with many mobile stations operating asynchronously within a single cell, global information must be sent frequently to allow these mobile stations to perform basic operations such as entering Idle mode or performing a System Access.

The transmission of overhead messages has a negative impact on the capacity of a system as the number of messages appended to the overhead message train reduces the number of mobile station control messages which may be sent in any single frame. Therefore, not all active overhead messages are sent by a BS in each overhead message train. Instead, they are typically appended to overhead message trains at periodic and regular intervals.

Following the overhead message train any mobile station control messages, e.g. a page message 707, awaiting transmission are transmitted and the remainder of the frame may be filled with control filler messages 708.

FIGS. 9A–9C illustrates the structure of some of the overhead messages. Each message comprises at least one word and each word comprises a number of fields.

FIG. 9A shows the structure of the system parameter overhead message. The message consists of two words. Among the fields of the first word 703 can be noted SID1 901, AUTH 902, and NAWC 903. Among the fields of the second word 704 can be noted a REGH 904 and REGR 905.

FIG. 9B shows the structure of a registration ID message 706.

The message consists of one word comprising a field called REGID 906.

FIG. 9C shows the structure of a registration increment global action message 705. The message consists of one word comprising a field called REGINCR 907.

The interpretation of the different fields mentioned above is as follows:

SID1—System IDentification number. Uniquely identifies all AMPS networks (systems) from each other.

AUTH—Authentication enabled bit. If set to 1, indicates that the network desires the mobile station to utilise the advanced verification features of AMPS to authenticate the mobile station's user subscription information.

NAWC—Number of Additional Words Coming count. The length −1 of the overhead message train being received.

REGH—REGistration for Home mobile stations enabled bit. If set, all mobile stations that identify the network as their home network must register with the network (the registration process is described more in detail further on), at network specified intervals.

REGR—REGistration for Roaming mobile stations enabled bit. Forces all non-home mobile stations to register with the network, at the network specified intervals.

REGID—REGistration IDentification value. A threshold value that is periodically incremented to cause small subsets of the mobile stations monitoring the FOCC to register with the network.

REGINCR—REGistration INCRement value. Used in the registration process to specify the interval between registration accesses by a mobile station to the network.

The information sent in the overhead messages can be considered as comprising two categories of information, system information and registration information.

System information controls the basic operation of an AMPS mobile station. The system information is vital, but tends to not change rapidly or not at all while the mobile station is camping on the same cell. Most of the system information is contained in the system parameter overhead message.

The registration information controls a feature called autonomous registration, which enables AMPS mobile stations to periodically access the AMPS network and send a registration message to inform the network of their presence. Although not mandatory, this form of registration is extremely common in AMPS networks.

The autonomous registration feature works as follows. Upon receipt of a registration ID overhead message (see FIG. 9B) by a mobile station, the mobile station performs a periodic registration calculation on the data received in the REGID-field of the message. The preferred periodic registration calculation algorithm is specified in section 2.6.2.1 of EIA/TIA-553. The algorithm is performed only if the network has explicitly enabled autonomous registration by setting the REGH 904 and/or REGR 905 bits in the system parameter overhead message received with the registration ID message. This algorithm begins by determining if the SID value derived from the SID1 value 906 of the system parameter overhead message received with the registration ID overhead message differs from the SID of the network in which the mobile station last registered. If the SID is different, the mobile station will perform a periodic registration access in the new network. If the SID has not changed, the mobile station must determine if the value of the received REGID-field 906 is greater than or equal to a NXTREG value stored in the mobile station. NXTREG represents the next REGID-field value at which the mobile station should perform a periodic registration access. During this comparision of NXTREG and the newly received REGID-field value, NXTREG may be updated to compensate for the REGID-field value cycling through zero, i.e. increasing past its maximum value of $2^{20}$ and starting again at a value close or equal to zero. If the received REGID-field value is greater than or equal to NXTREG, the mobile station will perform a periodic registration access to the network. If the REGID-field value to NXTREG comparision fails, the mobile station ignores the registration ID overhead message 706 and continues processing messages in Idle mode.

The periodic registration system access is designed to be a random event based on when each mobile enters a new network. At this point the next registration threshold NXTREG is calculated based on the content of the REGID-field of the first received registration ID message and the value of a REGINCR variable stored in the mobile station. A default value exists for the REGINCR variable, but may be modified by the network through a registration increment global action message (see FIG. 9C). The same calculation of a new registration threshold NXTREG is performed following all successful mobile originated calls, mobile terminated calls and registrations. This randomizes the registration of mobile stations within a network and prevents too many mobile stations from registering simultaneously. A network may control the time period between registration accesses by:

1. controlling the increment of the REGID-field between each transmission of a registration ID message;
2. controlling how frequent registration ID messages are sent;
3. controlling the registration calculation within the mobile station by providing a new REGINCR value via registration increment global action messages;
4. reset the REGH and REGR bits to prevent any registration accesses from occuring for some period of time.

It is however not possible to have exact control of the time period between registration accesses since in practice mobile stations can miss the reception of registration ID messages during the normal course of operation. Hence the network does not expect a mobile station to periodically register at exact points in time.

The invention at hand utilizes the way message transmission is organized in frames as illustrated in FIG. 7.

It may be noted that each frame can be considered as comprising a first sequence of messages 701 and a second sequence of messages 702. The first sequence of messages 701 consists of overhead messages 703–706 and possibly control filler messages 708, i.e. no message in the first sequence is addressed to a specific mobile station. The second sequence of messages 702 consists of at least one of the types of mobile station control messages 707 and control filler messages 708, i.e. the second sequence of messages may comprise messages addressed to specific mobile stations.

The basic idea of the invention is that a mobile station, being in idle mode (standby mode) and monitoring a FOCC, determines for at least a first frame a time period during which all transmitted words belong to messages in the first sequence of messages in the frame. The mobile station determines the time period according to a predetermined rule taking into account the extent of the first message sequence. The mobile station then performs a predetermined action other than receiving radio signals carrying the FOCC during the determined time period. The determined time period will be referred to as a free time period in this disclosure.

Since no message in the first sequence is addressed to a specific mobile station, the mobile station does not risk missing a page message by not monitoring the FOCC during the determined time period. There are several different options on what actions to perform during the free time period and there are several different rules that can be used to determine the free time period.

Applying the invention to the dual mode PCS1900/AMPS mobile station MS1 illustrated in FIGS. 1–3, enables the mobile station MS1 to scan for the PCS1900 network control channels CC4–CC6 without risk of missing any potential page message on the monitored AMPS control channel CC1. The invention also enables the mobile station MS1 to scan for better control channels CC2–CC3 in the AMPS network NET1 without risk of missing incoming calls. The invention further enables the mobile station MS1 to reduce power consumption when operating in idle mode in the AMPS network NET1 and thus offers an increase in operation time.

Figure 8A:
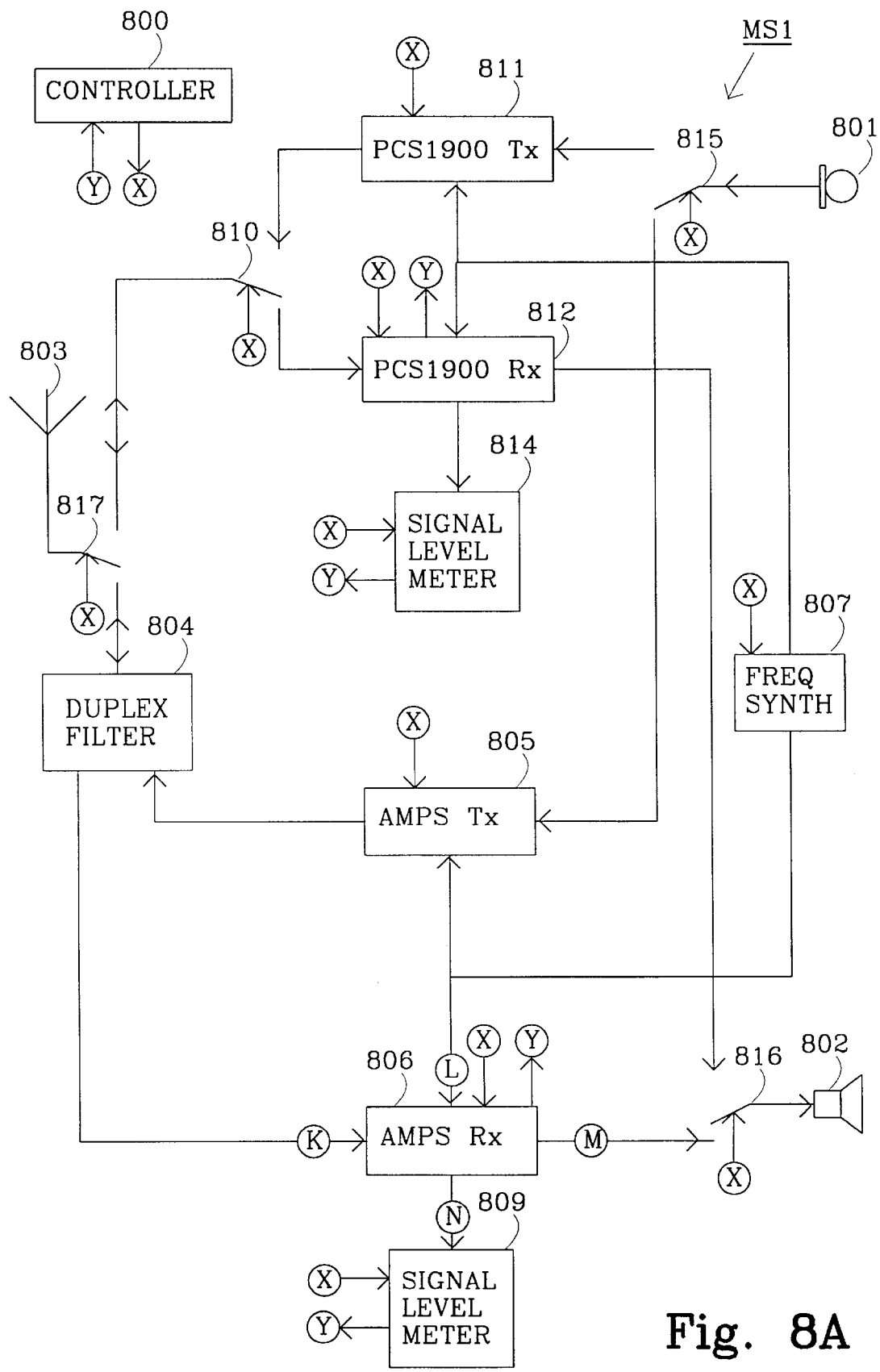
FIGS. 8A–8B contains block diagrams of a mobile station in accordance with the invention.
Figure 8B:
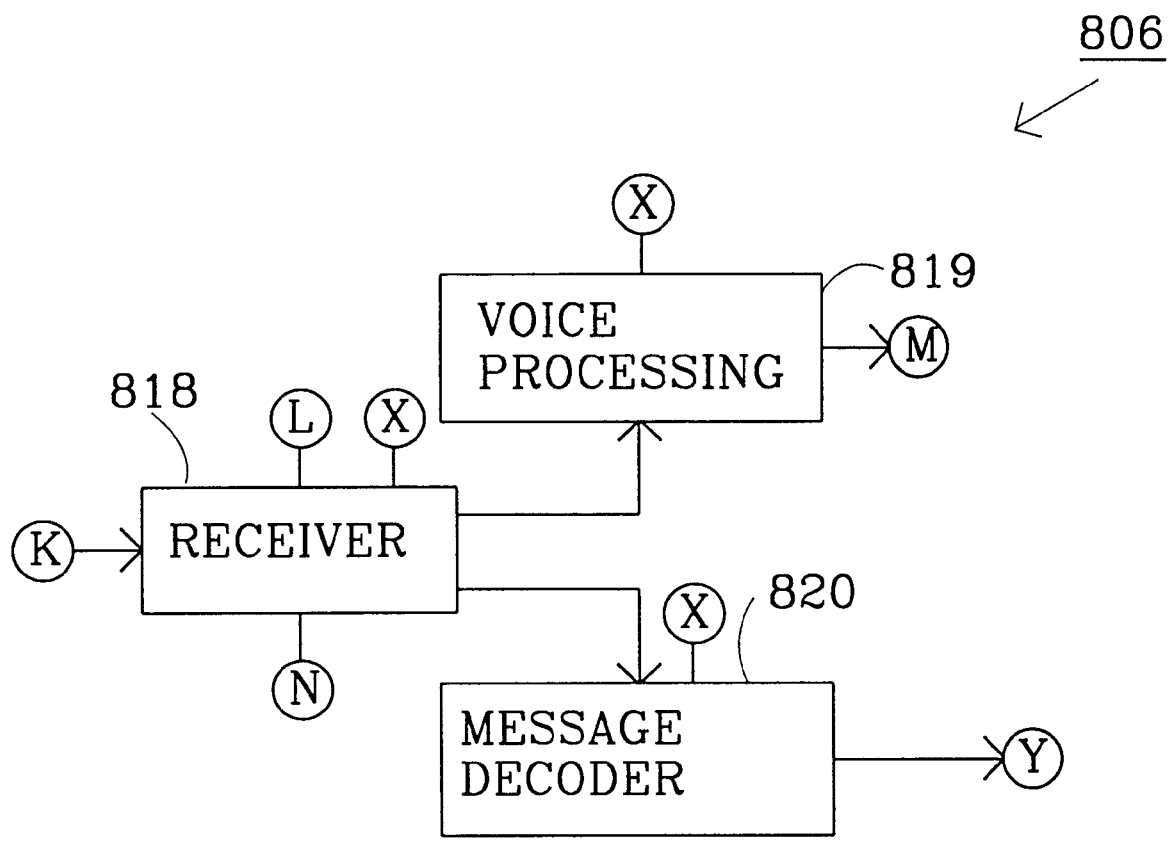

FIG. 8A and FIG. 8B show a block diagram of the dual mode PCS1900/AMPS mobile station MS1 comprising one embodiment of the present invention.

FIG. 8A shows how the mobile station MS1 comprises common blocks, AMPS specific blocks and PCS1900 specific blocks.

The common blocks comprise a controller 800, a microphone 801, an earphone 802, an antenna 803 and a frequency synthesizer 807. The AMPS specific blocks comprise a duplex filter 804, an AMPS Tx block 805, an AMPS Rx block 806 and a first signal level meter 809.

The PCS1900 blocks comprise a time duplex switch 810, a PCS1900 Tx block 811, a PCS1900 Rx block 812 and a second signal level meter 814.

The mobile station MS1 further comprises connecting means (switches) 815–817 that, dependending on whether the mobile station MS1 is to transmit or receive signals in the AMPS network NET1 or PCS1900 network NET2 in FIG. 3 respectively, connects either AMPS or PCS1900 specific blocks to the microphone 801, earphone 802, and antenna 803 respectively. The connecting means 815–817 are controlled by the controller 800.

The AMPS Tx block 805 and PCS1900 Tx block 811 are responsible for transforming the signal generated by the microphone 801 into radio signals to be transmitted to the AMPS network or the PCS1900 network respectively. The AMPS Tx block 805 and PCS1900 Tx block 811 are also responsible for transforming control information data supplied by the controller 800 into radio signals for transmission to the network NET1–NET2 in which the mobile station MS1 is currently operating.

The AMPS Rx block 806 and PCS1900 Rx block 812 are responsible for transforming radio signals, received from the AMPS network NET1 or PCS1900 network NET2 respectively, into a signal driving the earphone 802. The AMPS Rx block 806 and PCS1900 Rx block 812 are also responsible for transforming control channel radio signals received into data for further processing by the controller 800.

When the mobile station MS1 is scanning for a control channel in the AMPS or PCS1900 network, the AMPS Rx block 806 or PCS1900 Rx block 812 respectively are tuned to the selected radio channel frequency and the received signal energy is measured by the first 809 or second 814 signal level meter respectively. The measured signal strength is read and processed by the controller 800.

The frequency synthesizer 807 generates local oscillator signals used for the mixing of signals up to and down from radio frequency. Note that in PCS1900 time duplex is used, i.e. transmission and reception does not occur simultaneous, implying that only one local oscillator signal at a time needs to be generated. In AMPS however transmission and reception may occur similtaneous on different frequencies, and hence two local oscillator signals need to be generated. The synthesizer block 807 is capable of generating the nessecary local oscillator signals for operation in both the AMPS and PCS1900 networks.

The controller 800 executes stored program instructions and is responsible for the overall control of the mobile station MS1. The controller 800 processes data output by the Rx blocks 806, 812 and signal level meters 809, 814 and controls the other units in accordance with the program instructions. Connectors X and Y illustrates the interconnection between the controller 800 and the other units in FIG. 8. The controller 800 is assumed to support a number of built in timers.

Circuits that do not need to be active at a certain point in time are powered down to reduce power consumption. When the mobile station MS1 is operating in the PCS1900 network, all the AMPS specific circuits 805, 806, 809 are powered down at all times. As long as the mobile station MS1 is operating in standby mode the PCS1900 Tx block 811 is also powered down. When the mobile station MS1 is operating in the AMPS network, all the PCS1900 specific circuits 811, 812, 814 are powered down most of the time as well as the AMPS Tx block 805. However, during some of the free time periods, parts of the PCS1900 specific circuits are powered up to perform the scheduled activities.

FIG. 8B provides more details on the internal structure of the AMPS Rx block 806. Connectors K, L, M, N, X and Y in FIG. 8 and FIG. 8B illustrates how the AMPS Rx block 806, as shown in FIG. 8B, is connected to the remaining blocks of FIG. 8A.

In a receiver 818 the radio signals received are converted to a baseband signal. If the received radio signals carry speech information, a voice processing block transforms the baseband signal into the signal driving the earphone in FIG. 8A. When the mobile station MS1 is monitoring a control channel CC1 in the AMPS network NET1, the received radio signals carry AMPS control messages, and the baseband signal is input to a message decoder block 820. This block performs Manchester code demodulation, cumulative majority voting and CRC-checks as described in the patent U.S. Pat. No. 5,568,513. This way the mobile station MS1 performs a CRC-check on the accumulated information bits after each repetition of a control word in a word block 50 (see FIG. 5). As soon as a CRC-check indicates that the accumulated data bits and check bits are consistent with each other, a CRC-check indication is generated and the remaining word repeats in the word block need not be received. Upon check indication generation for the first word of the SPOM message in selected overhead message trains, the controller 800 determines a free time period. The free time period is calculated as lasting until a message following the overhead message train is expected according to the following formula:

$$T_F=(N\times T_{WB})+(5-R)\times T_W+T_{DWS} \quad (1)$$

where $T_F$ is the length of the free time period,

N is the value of the NAWC-field received in the SPOM, $T_{WB}$ is 46.3 milliseconds (i.e. the time needed to transmit one wordblock), R is the number of word repeats of the SPOM Word1 received before the CRC-check indication was generated, $T_W$ is 8.8 milliseconds (i.e. the time needed to transmit one A-word and one B-word) and $T_{DWS}$ is 2.3 milliseconds maximum (i.e. the time to transmit one Dotting field and one Word Sync field). Note, some Receive Block implementations may require the Receive Block to be turned on earlier, to help synchronize to the Dotting and/or Word Sync fields. In these instances, $T_{DWS}$ will be smaller by the amount of time used for resynchronization purposes. A way of maintaining synchronization without reading the dotting sequence and word sync fields is described in the international patent application WO96/41439.

Upon generation of a check indication for any other word the mobile station MS1 acts as described in U.S. Pat. No. 5,568,513, i.e. the mobile station MS1 may enter sleep mode for the remainder of the word block.

Figure 10:
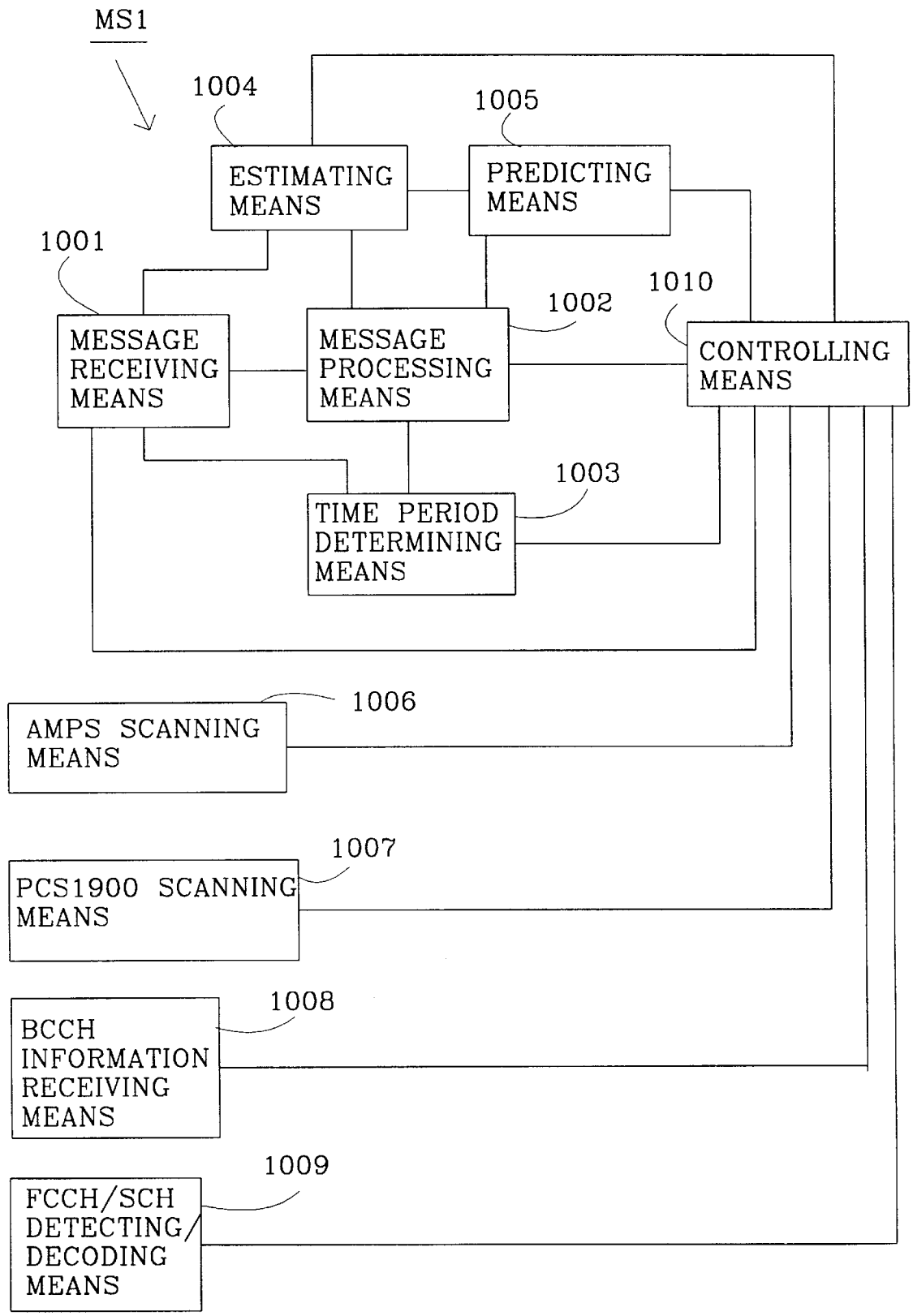
FIG. 10 is a functional block diagram of a mobile station in accordance with one embodiment of the invention.

FIG. 10 shows a functional block diagram of the dual mode PCS1900/AMPS mobile station MS1. Note that only function blocks related to the present invention are illustrated in FIG. 10. The mobile station MS1 comprises ten function blocks, message receiving means 1001, message processing means 1002, time period determining means 1003, estimating means 1004, predicting means 1005, AMPS scanning means 1006, PCS1900 scanning means 1007, BCCH information receiving means 1008, FCCH/SCH detecting and decoding means 1009 and controlling means 1010. In this embodiment, the function blocks 1003–1005 and 1010 are all implemented as software while the other function blocks are implemented in both hardware and software.

Figure 13A:
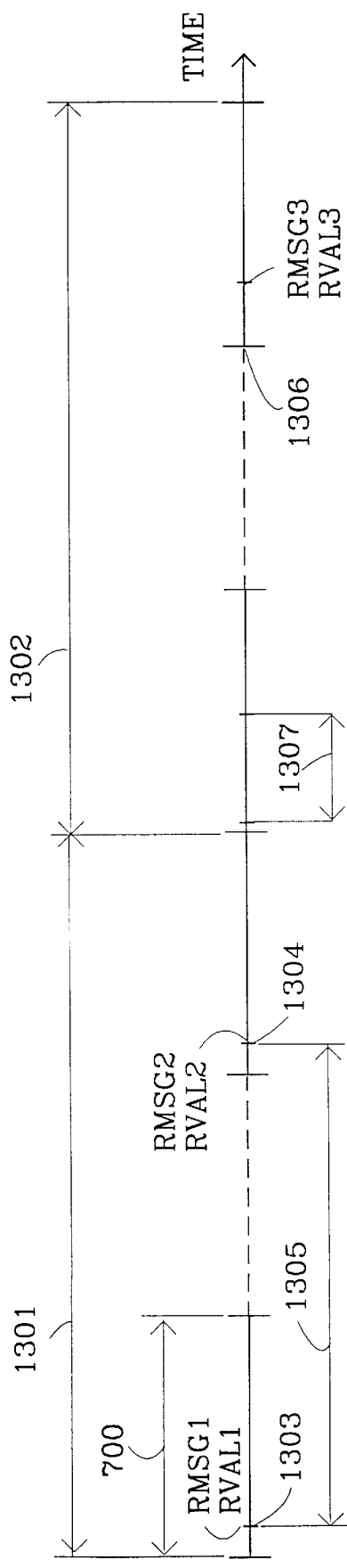
FIGS. 13A–13C contain time diagrams illustrating the idle mode operation of mobile stations according to different embodiments of the invention.

The idle mode operation of the mobile station MS1 is split in two different phases as illustrated in the time diagram shown in FIG. 13A. On the time axis TIME in FIG. 13A, the beginning/end of a number of frames 700 are indicated. The dashed parts of the time axis TIME each represent a number of intermediate frames 700. Whenever the mobile station MS1 enters idle mode, the mobile station first enters an initialization phase 1301. During this phase the mobile station MS1 gathers information considered necessary to be able to ignore most of the control words carrying overhead messages when after the initialization phase 1301 entering an operation phase 1302. In order to gather the necessary information the mobile station MS1 must always receive a system parameter overhead message. If the AUTH-field of the received system parameter overhead message indicates that an authentication procedure should be used, the mobile station MS1 must also receive a random variable, i.e. the mobile station must receive a random challenge A global action message and a random challenge B global action message.

If the REGH- and REGR-fields of the received system parameter overhead message indicates that autonomous registration should be used, the mobile station MS1 also gathers information that will enable it to support the autonomous registration feature and yet only process a few overhead message trains after entering the operation phase of idle mode. For this purpose, the message receiving means 1001 is arranged for receiving at least a first registration ID message RMSG1 having a first REGID-field value RVAL1 and a second registration ID message RMSG2 having a second REGID-field value RVAL2. The message processing means 1002 is arranged for extracting the first REGID-field value RVAL1 and the second REGID-field value RVAL2 from the received registration ID messages RMSG1 and RMSG2. The estimating means 1004 is arranged for estimating, based on time of reception 1303 of the first registration ID message RMSG1 and time of reception 1304 of the second registration ID messages RMSG2, an interval 1305 between consecutive registration ID messages. Based on the estimated interval 1305 and the difference between the second and the first REGID-values RVAL1 and RVAL2, the predicting means 1005 is arranged for predicting a first point in time 1306 just before a third registration ID message RMSG3 triggering the mobile station MS1 to register with the network NET1 is expected.

After gathering the necessary information, the mobile station MS1 enters the operation phase 1302 of idle mode. During the operation phase 1302 the mobile station MS1 starts ignoring parts of the overhead message trains to be able to perform other actions than monitoring the control channel CC1. The operation phase 1302 can be divided into to two subphases, before and after the predicted first point 1306 in time.

Before the first point 1306 in time, the message receiving means 1001 is arranged for receiving the first SPOM word in each frame 700. The message processing means 1002 processes each of said received words and identifies each word. Each time the message processing means 1002 identifies a word as being the first word of a SPOM message, the message processing means 1002 extracts a NAWC-field from the word. The time period determining means 1003 determines a free time period 1307 as lasting until a message following the transmission of a number of words as indicated by the extracted NAWC-field value is expected. During the determined free time period 1307 the controlling means 1010 schedules the mobile station MS1 to perform actions other than receiving radio signals carrying the monitored control channel CC1.

After the predicted first point in time 1306, the message receiving means 1001 is arranged for receiving all overhead messages in each consecutive frame 700 until the third registration ID message RMSG3 has been received. If this third registration ID message RMSG3 triggers the mobile station MS1 to register, the mobile station MS1 will leave AMPS idle mode to perform the registration. If this third registration ID message RMSG3 does not trigger the mobile station MS1 to register, the assumptions used by the predicted means 1005 in predicting when the mobile station MS1 should next register has been proven invalid and the mobile station MS1 reenters the initialization phase 1301 of idle mode operation in order to resynchronize with the registration ID message flow.

The free time periods during the operation phase of idle mode are scheduled as follows.

Periodically, e.g. once each 10 minutes, a scan for the other control channels CC2–CC3 in the AMPS network NET1 is initiated. The controlling means 1010 orders the AMPS scanning means 1006 to measure the received signal strength on a selected subset of the control channel frequencies on the network side (A or B) to which the AMPS network NET1 belongs. If not all control channel frequencies were measured during the free time period, scanning of the AMPS control channel frequencies is continued in the next free time period. If a better (i.e. stronger) control channel CC2 is found, i.e. a control channel CC2 that has stronger signal strength than the control channel CC1 the mobile station MS1 is currently monitoring, the mobile station MS1 may elect to leave idle mode and attempt to camp on this new cell C2. If the new cell turns out to belong to a different network (SID changes), then the mobile station MS1 may return to the previous serving cell C1 and continue to monitor the control channel CC1 in that cell C1.

As is obvious to a person skilled in the art, the mobile station MS1 may also scan for control channels in other AMPS networks, including channels on the opposite network side (A or B) from which the AMPS network NET1 belongs.

A scan for the PCS1900 control channels CC4–CC6 is inititated periodically, e.g. once each minute. The controlling means 1010 orders the PCS1900 scanning means 1007 to measure the received signal strength on a selected subset of the control channel frequencies in the PCS1900 network NET2. If not all control channel frequencies were measured during the free time period, scanning of the PCS1900 control channels is continued in the next free time period.

If, after measuring all the PCS1900 control channel frequencies, the mobile station MS1 determines, from the received signal strengths, that one or more BCCH-carriers CC4–CC6 may have been detected, the mobile station MS1 must verify that the received radio signals really belong to BCCH-carriers. Thus the controlling means 1010, selects the radio frequency on which the strongest signal strength was found and schedules the FCCH/SCH detecting means 1009 to try and detect a frequency correction control channel (FCCH), i.e. a frequency correction burst, on the selected frequency during the next free time period. If a frequency correction channel is found, the controlling means 1010 schedules the FCCH/SCH detecting means 1010 to try and detect a synchronization channel (SCH), i.e. a synchronization burst, in the following free time period. If both a frequency correction burst and a synchronization burst has been detected on the selected frequency, the controlling means 1010 concludes that a BCCH-carrier CC4 has been found.

Before the mobile station MS1 makes a decision whether it should leave AMPS idle mode to try and register in the cell corresponding to the found BCCH-carrier CC4, the mobile station MS1 must also receive some information, e.g. the network identity, transmitted on the broadcast control channel (BCCH) carried by the found BCCH-carrier CC4. For this purpose the controlling means 1010 schedules the BCCH information receiving means 1008 to receive broadcast control channel messages in a number of free time periods until enough information has been gathered to enable the mobile station MS1 to make a decision whether it should try and register in the cell corresponding to the found BCCH-carrier CC4.

If a free time period is not needed to perform any of the activities mentioned above, the controlling means 1010 schedules the mobile station MS1 to enter sleep mode during the free time period. A power up timer is set to expire at the end of the free time period and the frequency synthesizer 807 as well as the AMPS Rx block 806 is in FIG. 8A are powered down. When the power up timer expires at the end of the time period, the frequency synthesizer 807 and AMPS Rx block 806 are powered up again.

The flowcharts of FIGS. 11A–D provide more detail on the AMPS idle mode operation of the dual mode PCS1900/AMPS mobile station MS1. Connectors A–G show how the flowcharts are interconnected.

Figure 11A:
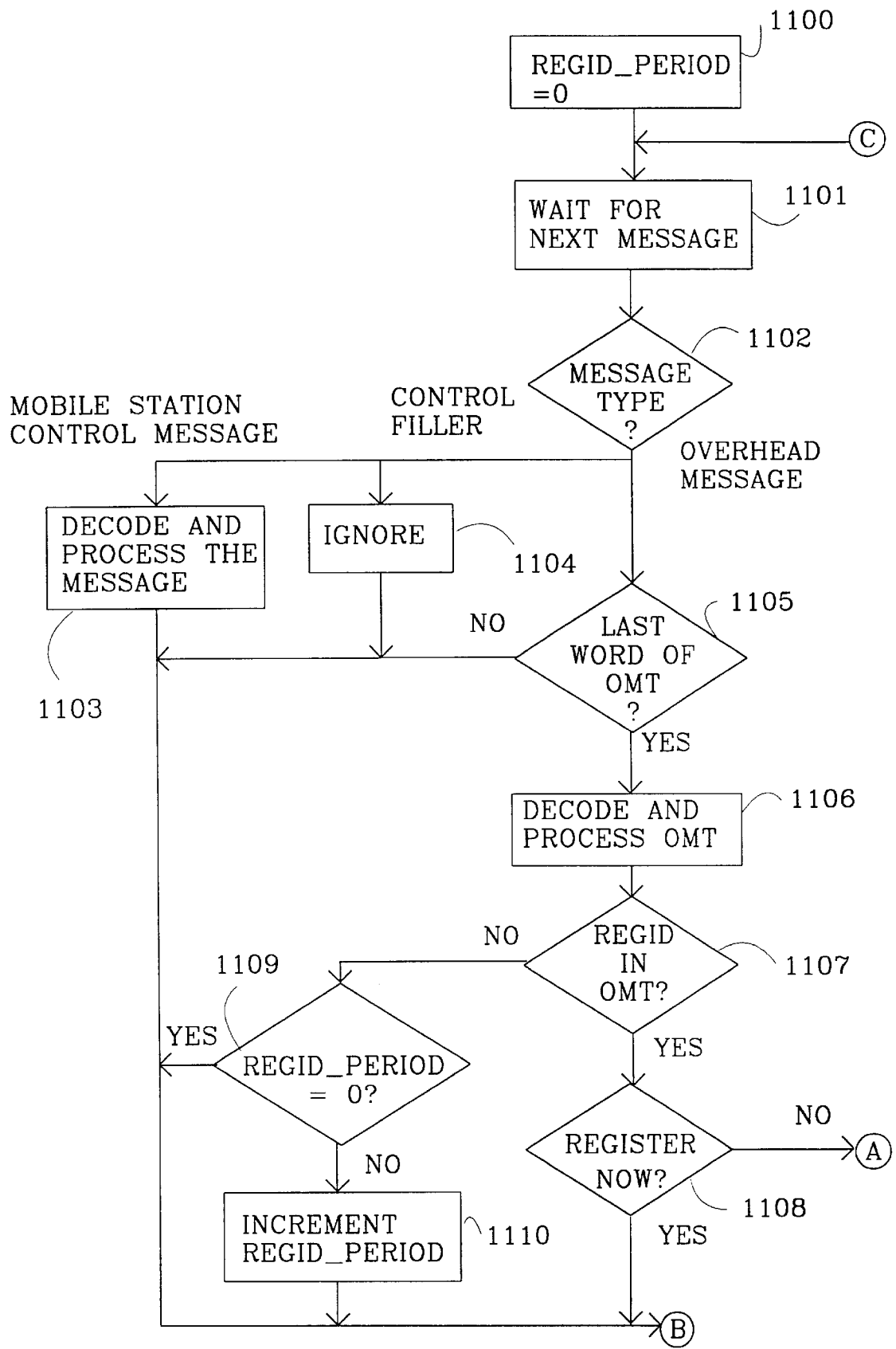
FIGS. 11A–11D contains flow charts providing details on the idle mode operation of the mobile station in FIG. 10.
Figure 11B:
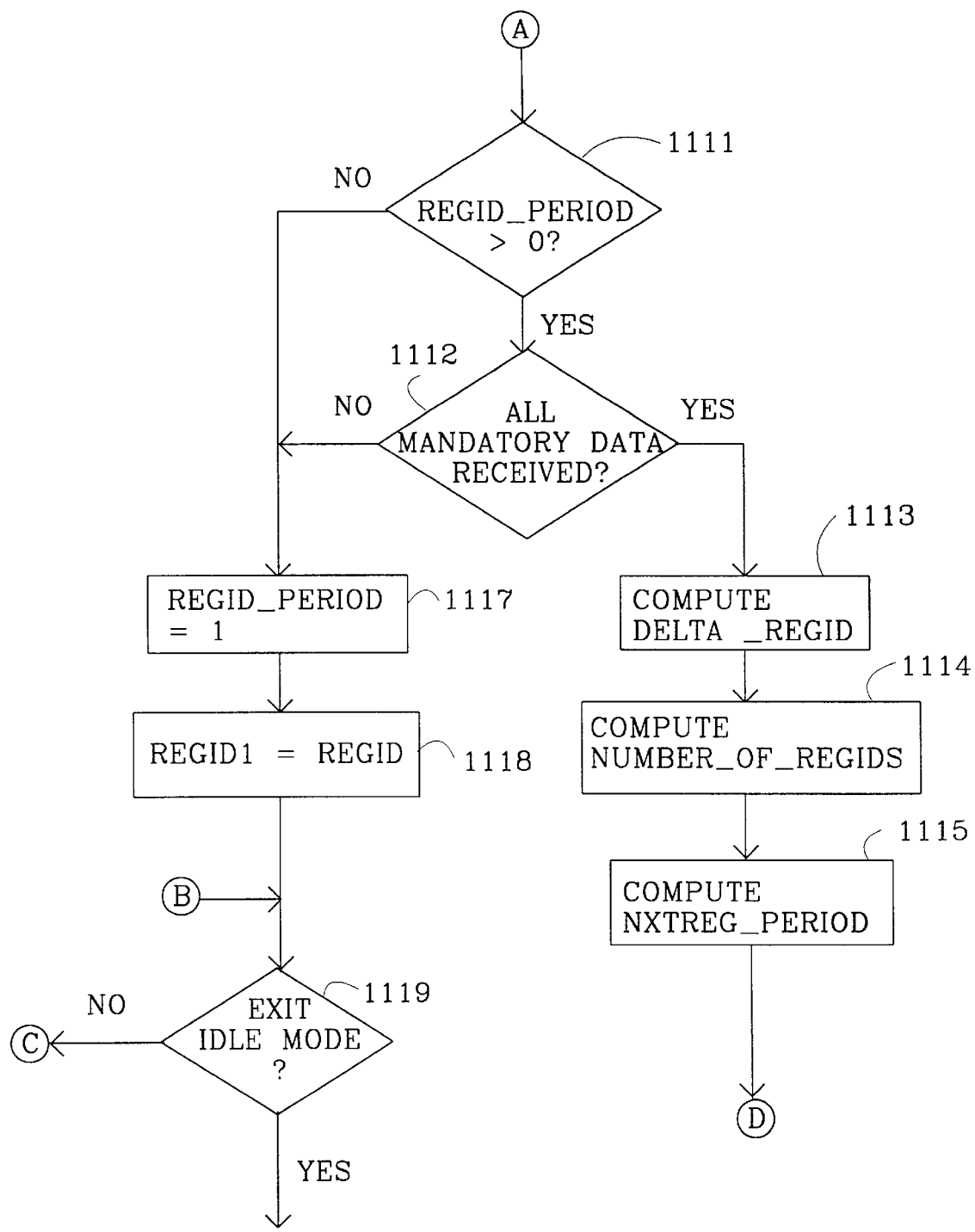

FIGS. 11A–11B illustrate the initialization phase in more detail. After entering Idle Mode, the mobile station at step 1100 in FIG. 11A resets a variable REGID_PERIOD to a value of 0, and then waits at step 1101 for the next valid message on the monitored FOCC. Upon receipt of the next message, the message type is determined at step 1102. If the message was a mobile station control message, the message is decoded and processed as for a standard AMPS mobile station at step 1103. If the message was a control filler message, the message is ignored at step 1104. After steps 1103 and 1104, processing continues at step 1119 in FIG. 11B.

If the received message was an overhead message, a check is made at step 1105 to determine if the received word is the final word of an overhead message train. If the check at step 1137 results in an alternative "NO", there remains more of the overhead message train to receive before it can be processed and the received word is stored before processing continues at step 1119 in FIG. 11B. If the check at step 1105 results in an alternative "YES", the words of the received overhead message train are processed at step 1106 as specified by EIA/TIA-553, beginning with the first SPOM word. A check is made at step 1107 to determine whether the overhead message train contained a registration ID message. If the check at step 1107 results in an alternative "NO", a check is made at step 1109 whether the value of REGID_PERIOD equals zero. If the check at step 1109 results in an alternative "YES", implying that no registration ID message has been received since entering the initialization phase, processing continues at step 1119. If the check at step 1109 results in an alternative "NO", implying that a first registration ID message has been received since entering the initialization phase, the value of REGID_PERIOD is incremented at step 1110 after which step 1119 is entered.

If the check at step 1107 results in an alternative "YES", a periodic registration calculation is performed at step 1108 to determine whether it is time to make a registration access. If the test at step 1108 results in an alternative "YES", indicating that its time to register, step 1119 is entered. If the test at step 1108 results in an alternative "NO", a check is made at step 1111 in FIG. 11B to determine whether the value of REGID_PERIOD is greater than 0, indicating that at least one previous registration ID message has been received. If the test at step 1111 results in an alternative "YES", a check is made at step 1112 to determine whether all mandatory data has been received. If either the test at step 1112 or step 1111 results in an alternative "NO", the value of REGID_PERIOD is set to 1 at step 1117 and the content of the REGID-field of the received registration ID message is stored in a variable REGID1 at step 1118, after which step 1119 is entered.

At step 1119, a check is made to determine whether the mobile station needs to exit idle mode. If the test at step 1119 results in an alternative "NO", processing is returned to step 1101. If the test at step 1119 results in an alternative "YES", the mobile station leaves idle mode and proceeds in the same manner as for a standard AMPS mobile station.

The mobile station MS1 may decide to leave idle mode for any of the reasons a standard AMPS mobile station decides to leave idle mode, e.g. to perform a registration access in response to a received registration ID message, to originate a call or respond to a page message.

If the test at step 1112 results in an alternative "YES", all information needed before entering the operating phase has been gathered and the initialization phase is concluded at steps 1113–1115. At this point, the REGID_PERIOD variable contains the number of overhead message trains between the last two overhead message trains containing registration ID messages. At step 1113 a variable DELTA_REGID is set to the difference between the REGID-field value of the registration ID-message just received and the value of the REGID1 variable. The DELTA_REGID variable thus contains the difference between REGID-values received in two consecutive registration ID messages. At step 1114 a variable NUMBER_OF_REGIDS is set to a predicted number of registration ID messages that must be transmitted before the REGID-field of a registration ID message will exceed the registration threshold value NXTREG, triggering the mobile station MS1 to register with the network NET1. The prediction is based on the assumption that the increment of the REGID-field of each consecutive registration ID message equals the value of DELTA_REGID. At step 1115, a variable NXTREG_PERIOD is set to the result of multiplying the value of DELTA_REGID with the value of NUMBER_OF_REGIDS, i.e. the NXTREG_PERIOD is set to the number of system parameter overhead messages that are predicted to be transmitted before a registration ID message triggering the mobile station to register with the network will be transmitted. Upon completion of step 1115, the initialization phase is completed and the mobile station enters the operation phase within idle mode.

Figure 11C:
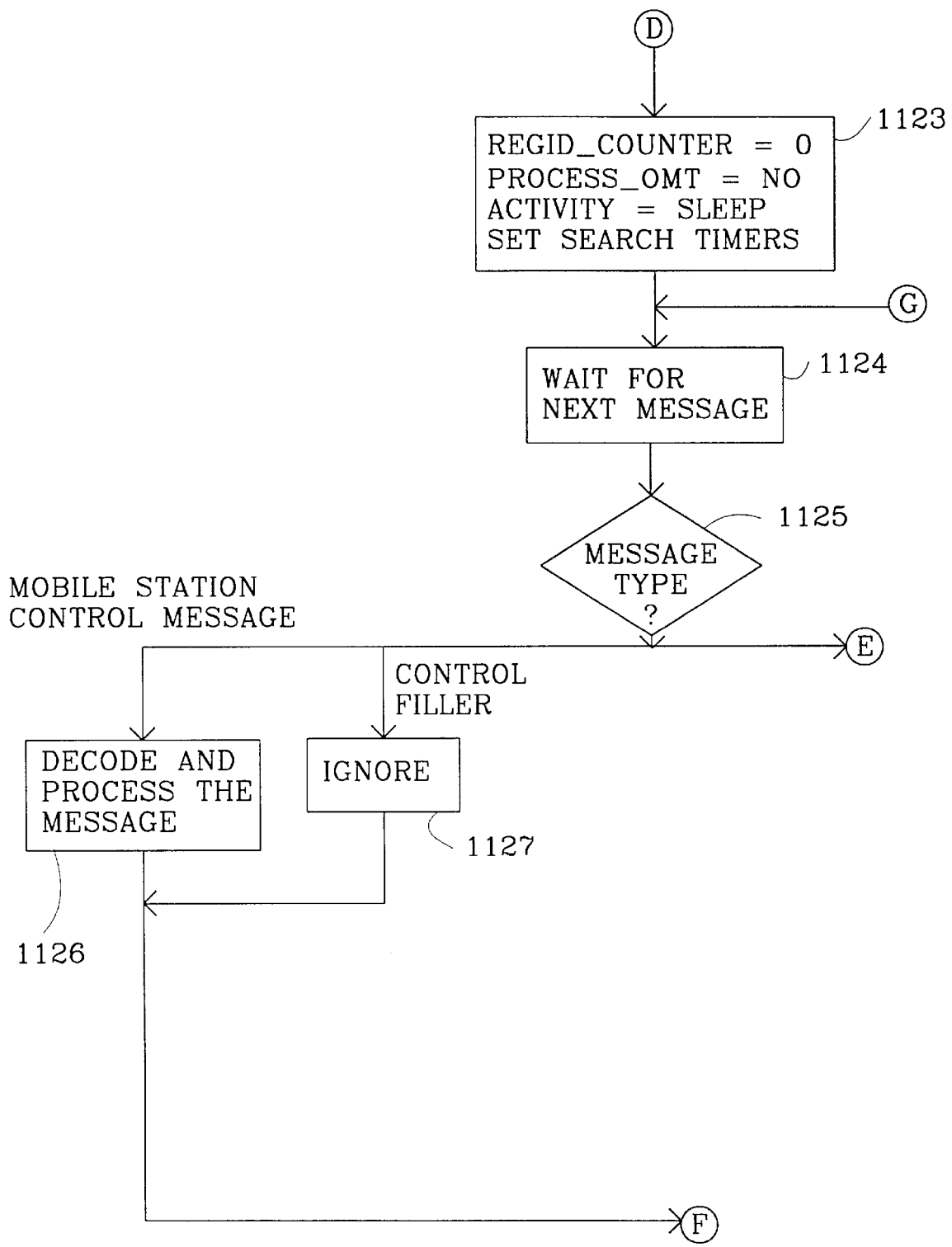
Figure 11D:
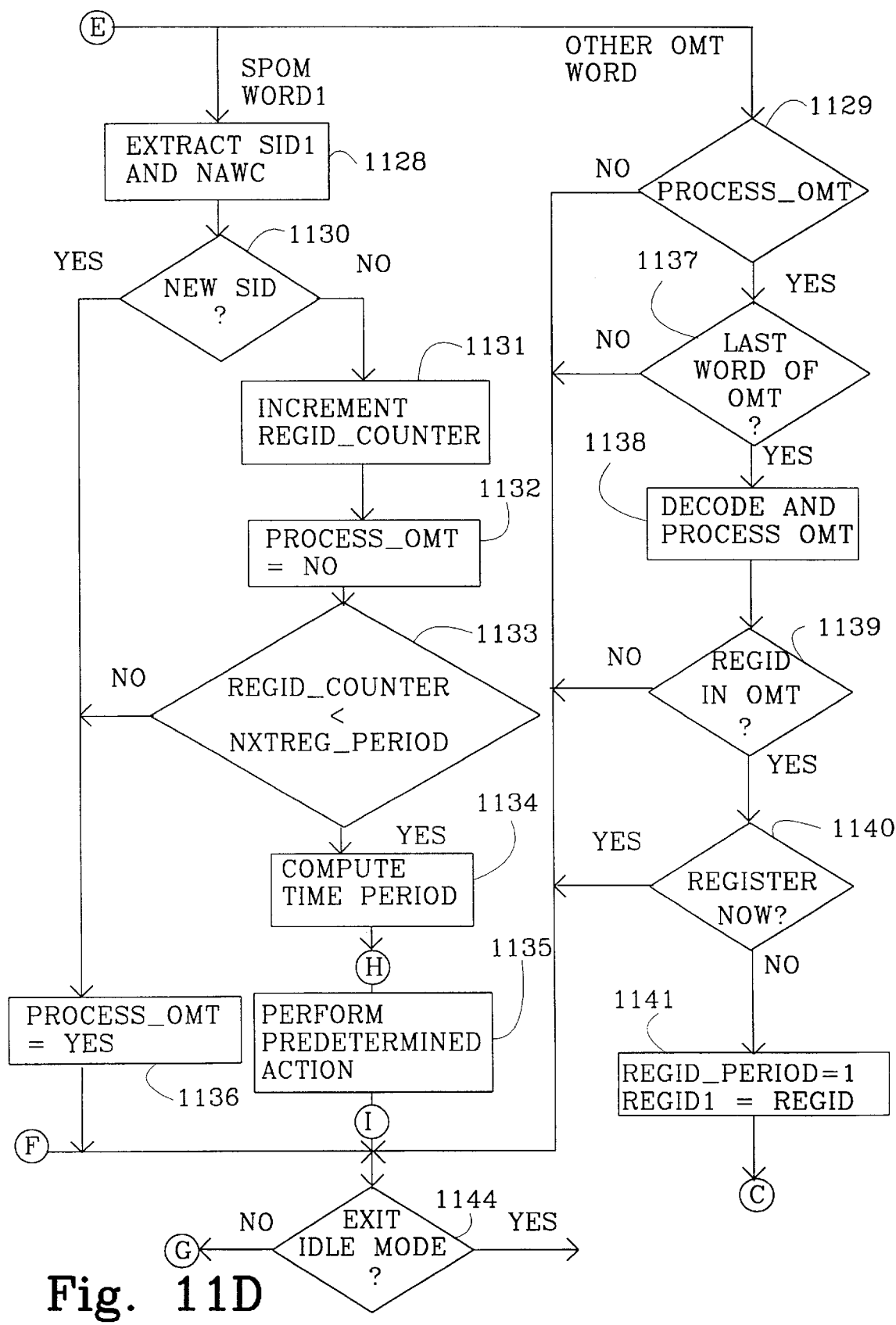

FIGS. 11C–11D illustrate the operation phase of idle mode. The mobile station MS1 enters the operation phase at step 1123 in FIG. 1C. At step 1123, a variable REGID_COUNTER is initialized to 0, a flag variable PROCESS_OMT is set to "NO", a variable ACTIVITY is set to "SLEEP" and two search timers, an AMPS search timer and a PCS1900 search timer, are set. The search timers are used to keep track of when it is time to initiate a scan for a better AMPS control channel CC2–CC3 or a PCS1900 control channel CC4–CC6. When one of the timers expires, a corresponding flag is set and the timer is reset. (The handling of timer expiration is not illustrated in the flowcharts).

After step 1123, processing continues at step 1124 where the mobile station MS1 waits for the next valid message on the monitored control channel CC1. Upon receipt of the next message, the message type is determined at step 1125.

If the message was a mobile station control message, the message is decoded and processed as in a standard AMPS mobile station at step 1126. If the message was a control filler message, the message is ignored at step 1127. After steps 1126 or 1127, processing continues at step 1144 in FIG. 11D.

If a first word of a system parameter overhead message was received, a SID1-value and a NAWC-value are extracted from the received word at step 1128. A check is made at step 1130 whether the received SID1 value differs from the expected SID1 value. If the check at step 1130 results in an alternative "YES", this implies that the mobile station MS1 is no longer monitoring the same FOCC data stream on control channel CC1, i.e. the mobile station has changed network. The PROCESS_OMT flag is set to "YES" at step 1136, after which processing continues at step 1144. If the check at step 1130 results in an alternative "NO" the REGID_COUNTER variable is incremented at step 1131 and the PROCESS_OMT flag is set to "NO" at step 1132. At step 1133 a check is made whether the content of the REGID_COUNTER variable is less than the content of the NXTREG_PERIOD variable. If the check at step 1133 results in an alternative "NO", implying that the current overhead message train is expected to contain the registration ID message triggering the mobile station MS1 to register with the network NET1, processing continues with steps 1136 and 1144 as previously described. If the check at step 1133 results in an alternative "YES", a time period, during which only words conveying overhead messages or control filler messages are transmitted, is determined at step 1134. The time period is determined as lasting until a message, following the transmission of a number of words as indicated by the extracted NAWC-field, is expected. At step 1135 the mobile station MS1 temporarily stops receiving radio signals carrying the monitored control channel CC1 and instead the mobile station MS1 performs other actions during the determined time period. A detailed account of what occurs at step 1135 is provided in the flowcharts of FIGS. 12A–12D. After completion of step 1135, processing continues at step 1144, unless the mobile station MS1 decided at step 1135 to exit AMPS idle mode.

If the received word was found at step 1125 in FIG. 11C to be a second word of a system parameter overhead message or a word conveying any other overhead message than a system parameter overhead message, the PROCESS_OMT flag is checked at step 1129. If the PROCESS_OMT flag was set to "NO" (an alternative "NO" at step 1129), processing continues at step 1144. If the flag was set to "YES" (an alternative "YES" at step 1129), a check is made at step 1137 to determine if the received word is the final word of the overhead message train. If the check at step 1137 results in an alternative "NO", there remains more of the overhead message train to receive before it can be processed and the received word is stored before processing continues at step 1144. If the check at step 1137 results in an alternative "YES", the words of the received overhead message train are processed at step 1138 as specified by EIA/TIA-553, beginning with the first SPOM word. At step 1139 a check is made whether the received overhead message train contains a registration ID message. If the check at step 1139 results in an alternative "YES", a check is made at step 1140 whether this registration ID message triggers a registration access. If the check at step 1140 results in an alternative "NO", this indicates that the prediction made at the end of the initialization phase on when the mobile station MS1 next should register has become invalid. The reason is probably that the AMPS network NET1 has adjusted the registration period by sending fewer registration ID messages or decreasing the increment of the REGID-field value between each consecutive message. Either way, the mobile station MS1 needs to resynchronize with the registration ID message stream. To do this, the REGID_PERIOD is reset to a value of 1 and the REGID1 variable is re-initialized to the REGID-value received in the last registration ID message at step 1141. The mobile station MS1 then returns to the initialization phase of Idle mode and thus enters step 1101 once again.

If either the check at step 1139 results in an alternative "NO" or the check at step 1140 results in an alternative "YES", processing is continued at step 1144. At step 1144, a check is made to determine whether the mobile station MS1 needs to exit idle mode. If the test at step 1144 results in an alternative "NO" processing is returned to step 1124. If the test at step 1144 results in an alternative "YES" the mobile station leaves idle mode and proceeds in the same manner as a standard AMPS mobile station.

The mobile station MS1 may decide to leave idle mode for any of the reasons a standard AMPS mobile station decides to leave idle mode.

FIGS. 12A–12D contains flowcharts illustrating how a free time period during which the mobile station MS1 at step 1135 in FIG. 11D stops monitoring the AMPS control channel CC1 is scheduled to perform different actions. Connectors J–N shows how the flowcharts in FIGS. 12A–12D are interconnected. Connectors H and I shows how the flowcharts in FIGS. 12A–12D and the flowchart in FIG. 11D are interconnected.

Figure 12A:
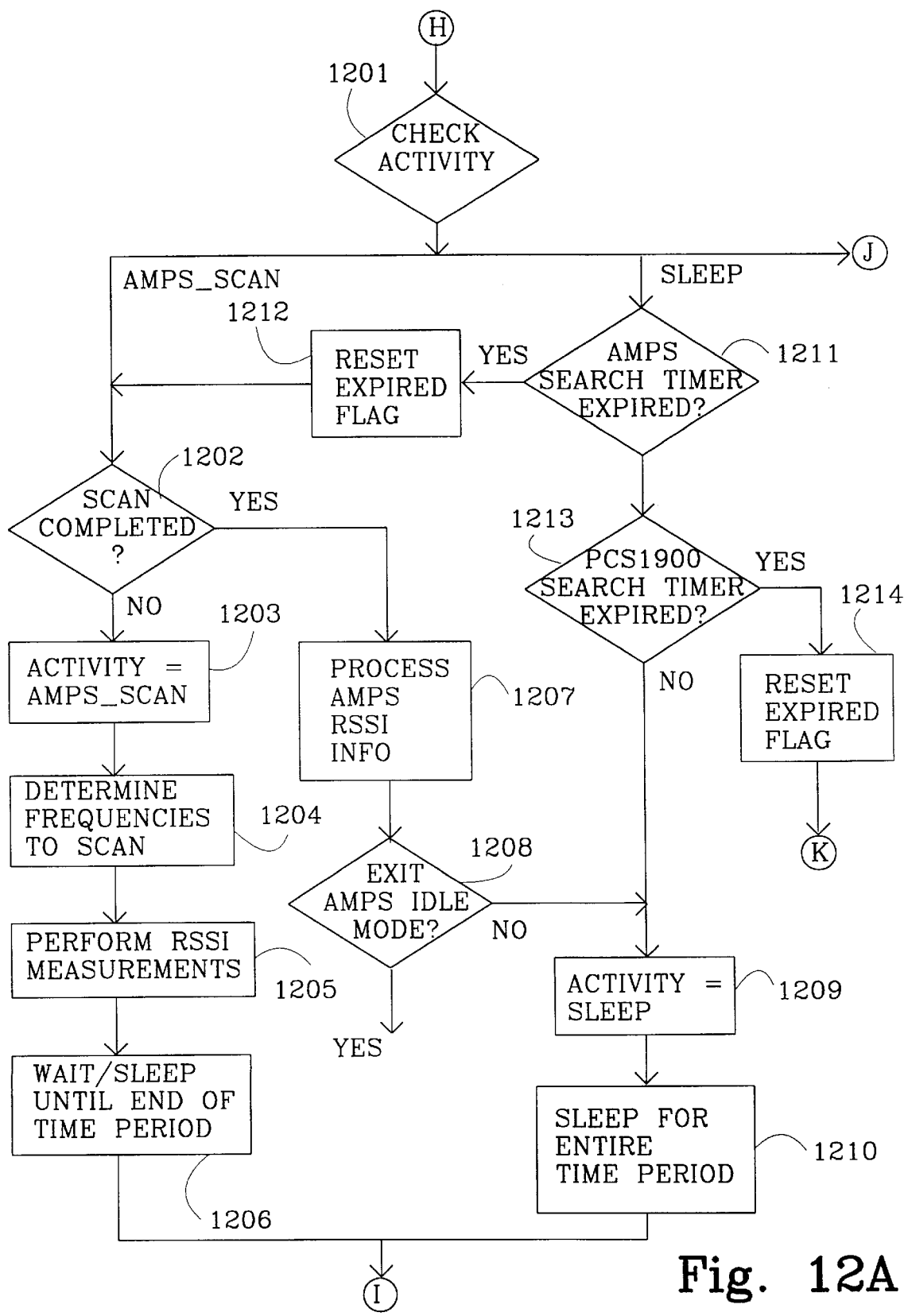
FIGS. 12A–12D contains flow charts providing details on how the mobile station in FIG. 10 operates during a free time period.

At step 1201 in FIG. 12A the setting of the variable ACTIVITY is checked. If the result of test is an alternative "AMPS_SCAN", a check is made at step 1202 whether all relevant AMPS frequencies have been scanned. Scanning may involve measuring the signal strength of each frequency more than once. The preferred way of scanning involves measuring the signal strength of each frequency in at least two different free time periods and either select the strongest measurement or calculate an average value of the measurements in order to reduce the effects of fading.

If the test at step 1202 results in an alternative "NO", ACTIVITY is set to "AMPS_SCAN" at step 1203. At step 1204 it is decided which AMPS frequencies to scan this time. At step 1205, the actual scanning is performed as previously described. At step 1206 the mobile station MS1 waits or enters sleep mode until the end of the free time period before processing is returned to step 1144 in FIG. 11D. If the test at step 1202 results in an alternative "YES" the mobile station MS1 performs an analysis at step 1207 of the signal strength measurements gathered for all relevant AMPS frequencies during the latest scan to determine whether the mobile station MS1 should try and camp on another better AMPS control channel. Depending on the outcome of the analysis at step 1207, the mobile station MS1 at step 1208 either decides to leave AMPS idle mode (alternative "YES") or to remain in idle mode (alternative "NO"). In the latter case processing continues at step 1209 by setting the ACTIVITY variable to "SLEEP" after which the mobile station MS1 at step 1210 enters sleep mode for the entire free time period. When the mobile station MS1 leaves sleep mode at the end of the free time period, processing is returned to step 1144 in FIG. 11D.

If the result of the test at step 1201 is an alternative "SLEEP", the AMPS search timer expired flag is checked at step 1211 to determine whether it is time to initiate a new scan for a better AMPS control channel. If the check at step 1211 resulted in an alternative "YES", the AMPS search timer expired flag is reset at step 1212 after which processing continues at step 1202 as described above. If the test at step 1211 resulted in an alternative "NO", the PCS1900 search timer expired flag is checked at step 1213 to determine whether it is time to initiate a new scan for a PCS1900 control channel. If the check results in an alternative "NO", the mobile station enters sleep mode via steps 1209 and 1210 as previously described. If the check at step 1213 resulted in an alternative "YES", the PCS1900 search timer expired flag is reset at step 1214 after which processing continues at step 1215 in FIG. 12B.

Figure 12B:
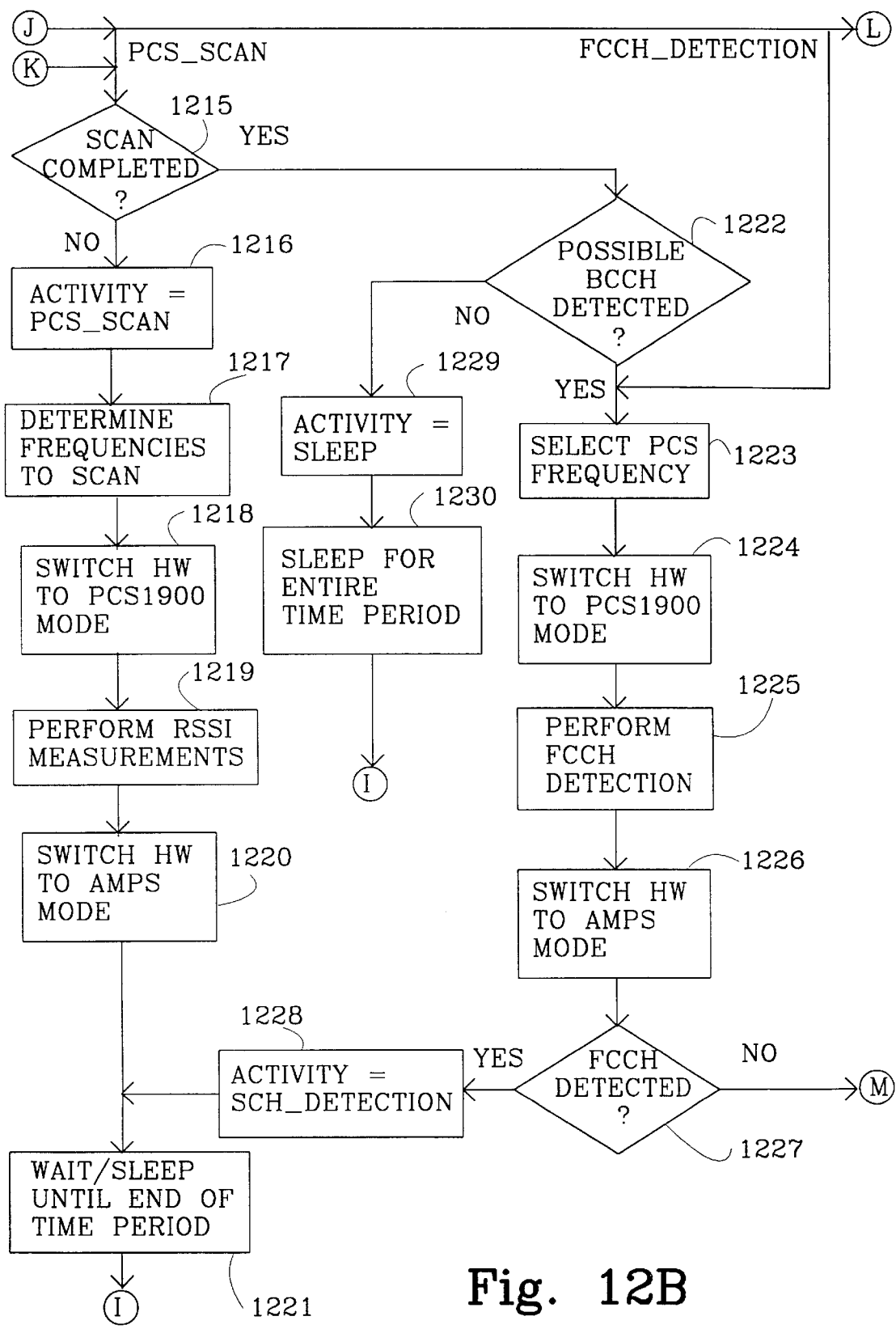
Figure 12C:
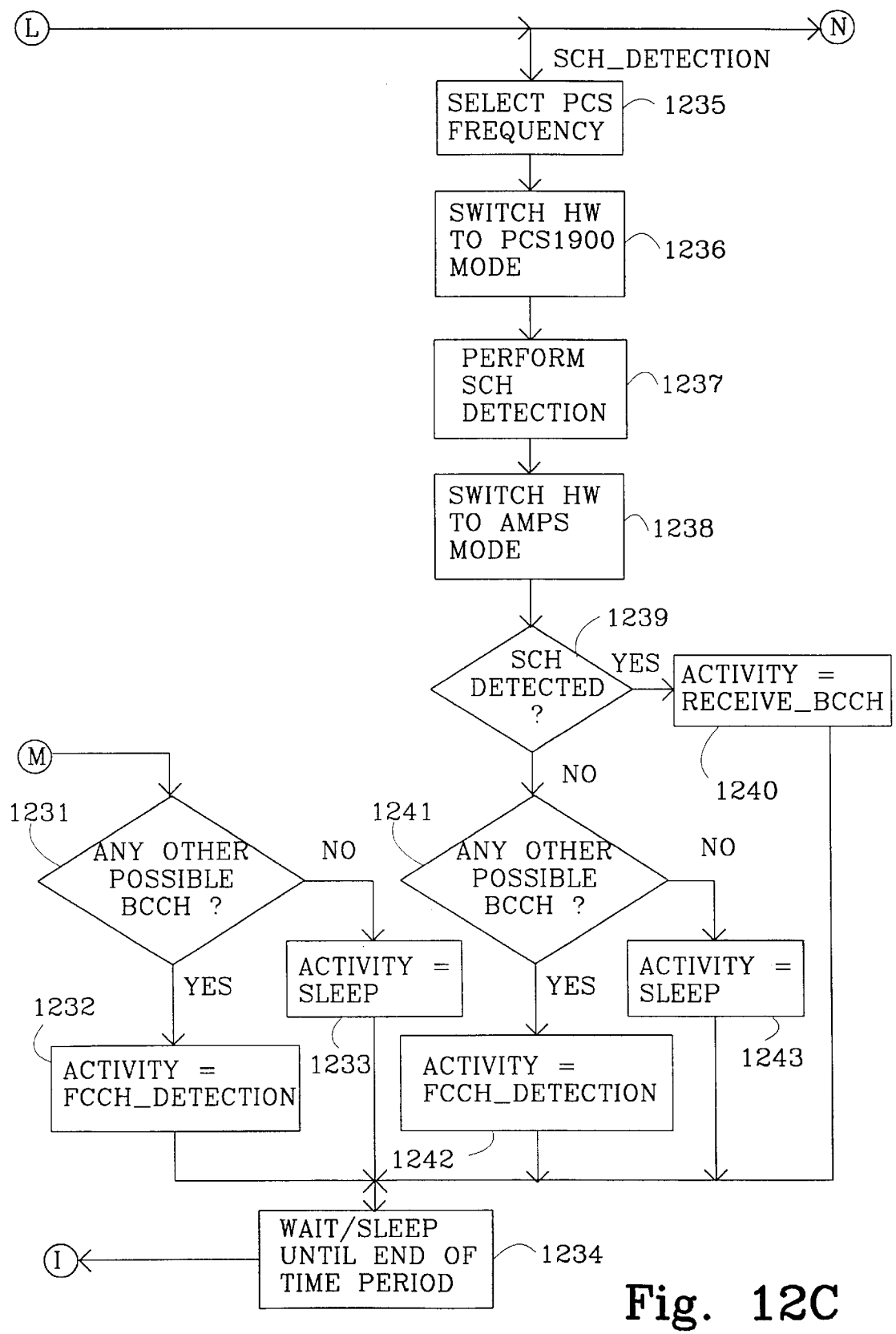
Figure 12D:
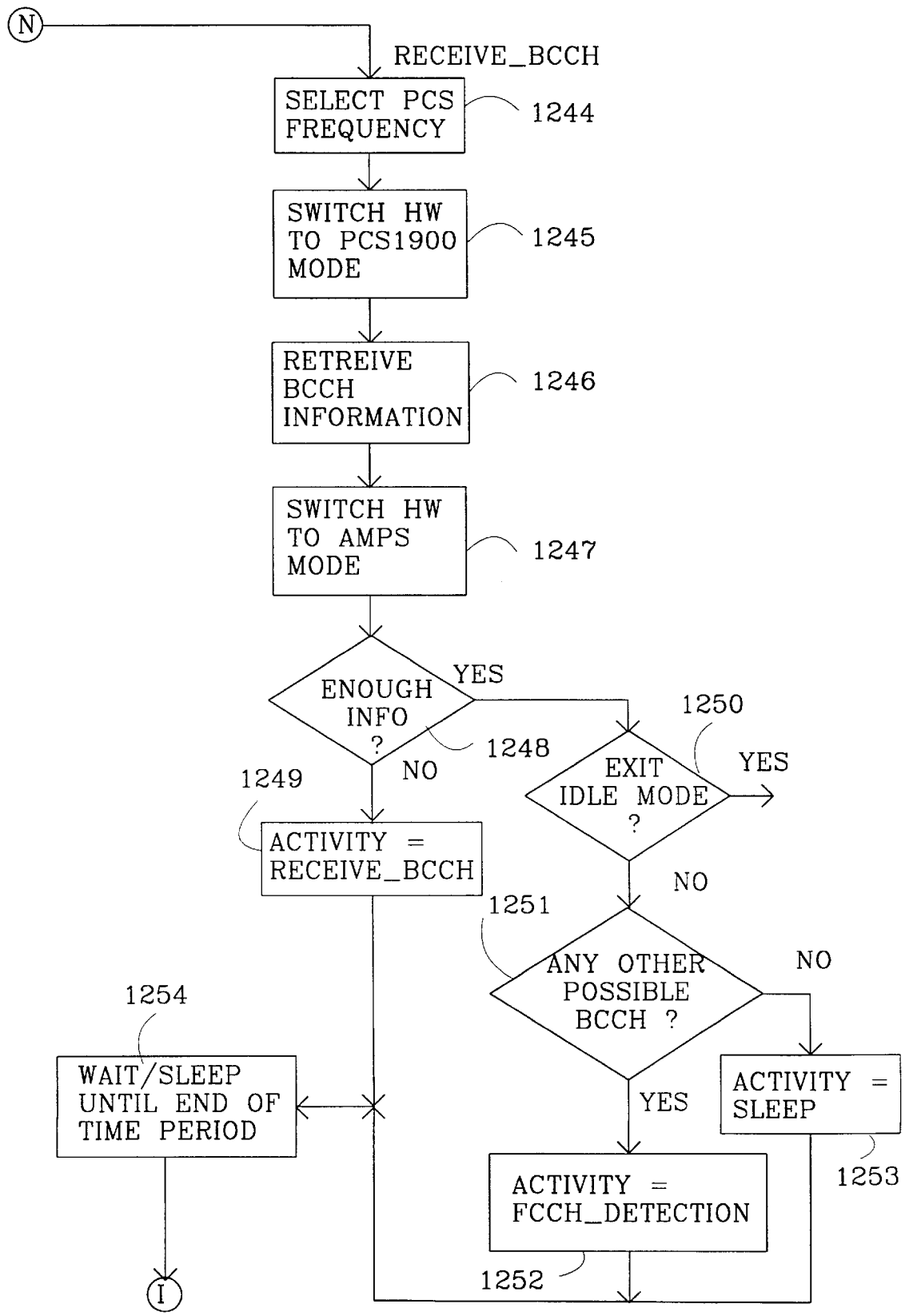

Processing also continues at step 1215 in FIG. 12B if the result of the test at step 1201 is an alternative "PCS_SCAN". At step 1215 a check is made whether all relevant PCS1900 frequencies have been scanned. Scanning may involve measuring the signal strength of each frequency more than once. The preferred way of scanning involves measuring the signal strength of each frequency in at least two different free time periods and either select the strongest measurement or calculate an average value of the measurements in order to reduce the effects of fading.

If the test at step 1215 results in an alternative "NO", ACTIVITY is set to "PCS_SCAN" at step 1216. At step 1217 it is decided which PCS1900 frequencies to scan this time. At step 1218 the hardware of the mobile station MS1 is switched to PCS1900 mode. At step 1219 the actual scanning is performed as previously described. At step 1220 the hardware of the mobile station MS1 is switched back to AMPS mode. At step 1221 the mobile station MS1 waits or enters sleep mode until the end of the time period before processing is returned to step 1144 in FIG. 11D. If the test at step 1215 results in an alternative "YES" the mobile station MS1, at step 1222, determines, from the signal strength measurements gathered for all the relevant PCS1900 frequencies, whether one or more possible BCCH-carriers have been detected. The PCS1900 frequencies on which BCCH-carriers may have been encountered is arranged in a list sorted by the measured signal strength. If the processing at step 1222 results in an alternative "NO", ACTIVITY is set to "SLEEP" at step 1229 and the mobile station enters sleep mode for the entire time period. When the mobile station leaves sleep mode at the end of the time period, processing is returned to step 1144 in FIG. 11D.

If the processing at step 1222 results in an alternative "YES", the mobile station MS1 selects at step 1223, the PCS1900 frequency with the strongest signal on the list generated at step 1222. At step 1224 the hardware of the mobile station MS1 is switched to PCS1900 mode. At step 1225 the mobile station MS1 tries to detect a Frequency Correction CHannel (FCCH), i.e. a frequency correction burst. At step 1226 the hardware is switched back to AMPS mode. At step 1227 a check is made whether a frequency correction burst was received. If the result of the check is an alternative "YES", ACTIVITY is set to "SCH_DETECTION" at step 1228, before entering step 1221. If the result of the check at step 1227 is an alternative "NO", implying that no BCCH-carrier is transmitted on the selected frequency, processing continues at step 1231 in FIG. 12C. At step 1231 a check is made to determine whether a BCCH-carrier may have been encountered on any of the other PCS1900 frequencies. If the check results in an alternative "YES", ACTIVITY is set to "FCCH_DETECTION" at step 1232. If the check results in an alternative "NO", ACTIVITY is set to "SLEEP" at step 1233. After steps 1232 and 1233, step 1234 is entered.

If the result of the test at step 1201 is an alternative "FCCH_DETECTION", the mobile station MS1 will select the next PCS1900 frequency on the list generated at step 1222 and processing continues at step 1223 as described previously.

If the result of the test at step 1201 is an alternative "SCH_DETECTION", implying that the mobile station during the previous free time period detected what was considered as being a FCCH on a certain PCS frequency, the mobile station MS1 selects this same frequency at step 1235. At step 1236 the hardware of the mobile station is switched to PCS1900 mode. At step 1237 the mobile station tries to detect a synchronization channel, i.e. a synchronization burst on the selected frequency. At step 1238 the hardware is switched back to AMPS mode. At step 1239 a check is made whether a synchronization burst was received. If the result of the check is an alternative "YES", implying that a BCCH-carrier has been encountered, ACTIVITY is set to "RECEIVE_BCCH" at step 1240. If the result of the check at step 1239 is an alternative "NO", a check is made at step 1241 whether there is another PCS1900 frequency for which FCCH/SCH-detection should be carried out. If the result of the check is an alternative "YES", ACTIVITY is set to "FCCH_DETECTION" at step 1242. If the result of the check at step 1241 is an alternative "NO", ACTIVITY is set to "SLEEP" at step 1243. After both steps 1242 and 1243 step 1234 is entered. At step 1234 the mobile station MS1 waits or enters sleep mode until the end of the free time period before processing is returned to step 1144 in FIG. 11D.

If the result of the test at step 1201 is an alternative "RECEIVE_BCCH", implying that the mobile station MS1 in the previous free time period verified that a BCCH-carrier CC4 is transmitted on a certain frequency, the mobile station MS1 selects this same frequency at step 1244. At step 1245 the hardware of the mobile station MS1 is switched to PCS1900 mode. At step 1246 the mobile station MS1 receives broadcast control channel messages, i.e. so-called system information messages, transmitted on the BCCH logical channel of the BCCH-carrier CC4. At step 1247 the hardware is switched back to AMPS mode. At step 1248 a check is made whether sufficient information has been gathered to determine whether the mobile station MS1 should try and register in the PCS1900 cell corresponding to the found BCCH-carrier CC4. If the result of the check is an alternative "NO", ACTIVITY is set to "RECEIVE_BCCH" at step 1249. If the result of the check at step 1248 is an alternative "YES", the gathered BCCH information is used at step 1250 to determine whether the mobile station MS1 should try and register with the PCS1900 network. If the processing at step 1250 results in an alternative "YES", the mobile station MS1 will exit idle mode and attempt to register with the PCS1900 network. If the processing at step 1250 results in an alternative "NO", implying that the found PCS1900 cell is not a suitable cell to camp on, a check is made at step 1251 whether there is at least one additional PCS1900 frequency with sufficient signal strength for carrying a BCCH-carrier. If the check at step 1251 results in an alternative "YES", ACTIVITY is set to "FCCH_DETECTION" at step 1252. If the check at step 1251 results in an alternative NO, ACTIVITY is set to "SLEEP" at step 1253. After both steps 1252 and 1253, step 1254 is entered.

At step 1254 the mobile station MS1 waits or enters sleep mode until the end of the free time period before processing is returned to step 1144 in FIG. 11D.

An alternative way of implementing a dual mode PCS1900/AMPS mobile station, comprising a second embodiment of the invention, can be derived from the first embodiment just described.

Figure 14:
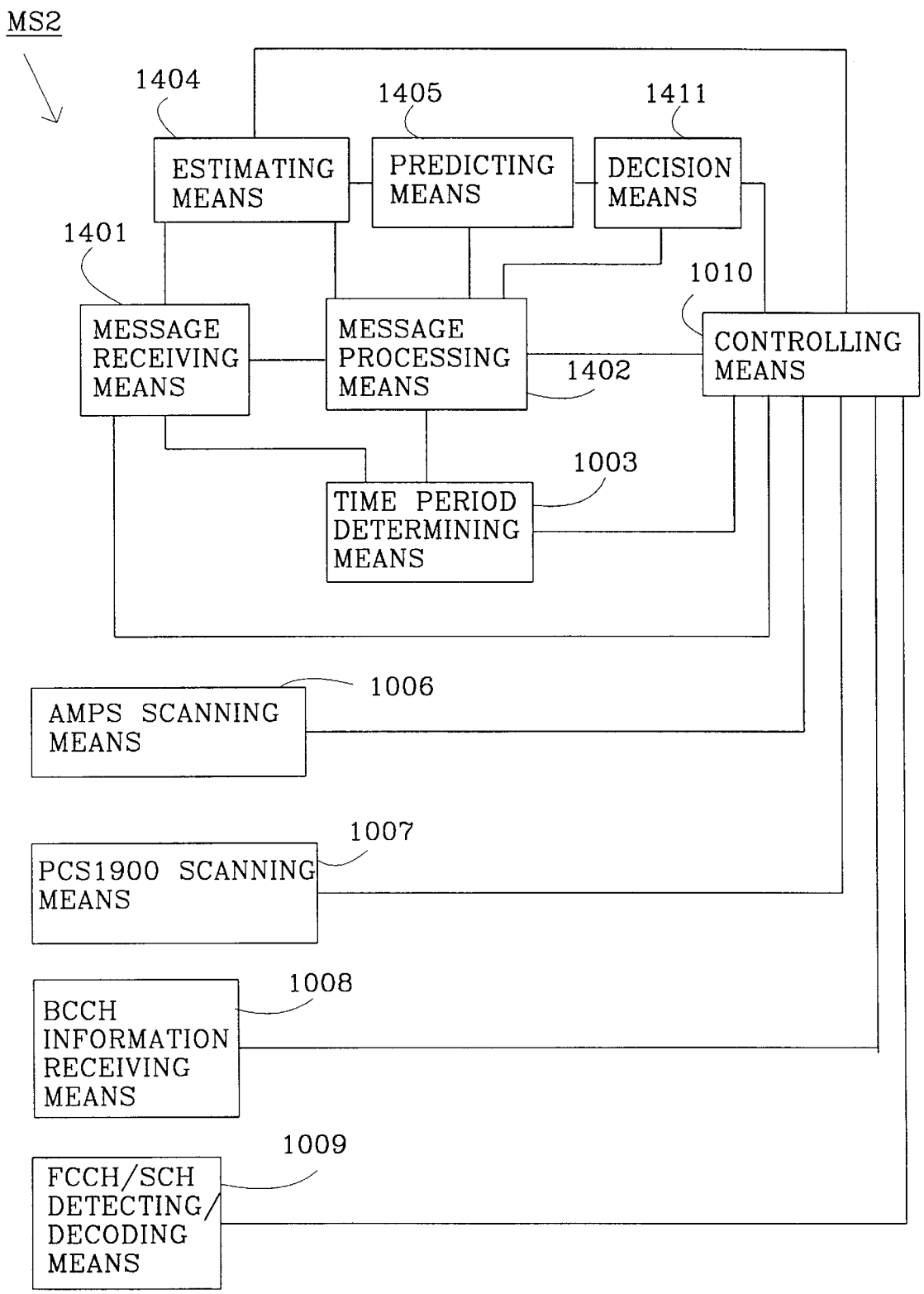
FIG. 14 is a functional block diagram of a mobile station in accordance with a second embodiment of the invention.

FIG. 14 shows a functional block diagram of the dual mode PCS1900/AMPS mobile station MS2 comprising the second embodiment of the invention. The mobile station MS2 comprises the function blocks 1003, 1006–1010 which are identical in both the first and second embodiments of the invention. The mobile station MS2 further comprises some function blocks 1401, 1402, 1404, 1405 which performs a superset of the tasks performed by the corresponding function blocks 1001, 1002, 1004, 1005, in the first embodiment of the invention. The mobile station MS2 also comprises an additional function block decision means 1411.

The second embodiment of the invention will be described in terms of the differences as compared to the first embodiment.

The mobile station MS2 operates during an initialization phase of idle mode in basically the same way as in the first embodiment of the invention. However, at the end of the initialization phase, the predicting means 1405 is arranged for predicting, in addition to said first point in time, also a second point in time before a fourth registration ID message is expected.

Figure 13B:
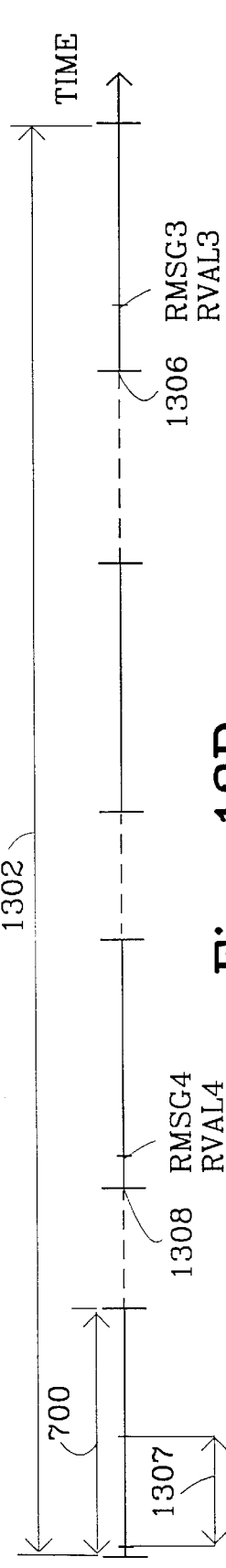

In FIG. 13B, the part of the time diagram in FIG. 13A corresponding to the operation phase 1302 of idle mode has been expanded. The fourth registration ID message RMSG4 having a fourth REGID-value RVAL4 is illustrated in FIG. 13B The fourth registration ID message RMSG4 is one of the registration ID messages transmitted before said third registration ID message RMSG3 and thus the second point in time 1308 is previous to said first point in time 1306.

The predicting means 1405 is also arranged for predicting an expected value for the REGID-value RVAL4 of the fourth registration ID message RMSG4.

After completing the initialization phase, the mobile station MS2 enters the operation phase 1302 of idle mode.

In a similar way as for the first embodiment of the invention, the operation phase 1302 can be divided into different subphases, before and after the predicted second point in time 1308. Before the second point in time 1308, the message receiving means 1401 is arranged for receiving the first SPOM word in each frame 700. The message processing means 1402 processes each of said received words and identifies each word. Each time the message processing means 1402 identifies a word as being the first word of a SPOM message, the message processing means 1402 extracts a NAWC-field from the word. The time period determining means 1003 determines a free time period 1307 as lasting until a message following the transmission of a number of words as indicated by the extracted NAWC-field value is expected. During the determined free time period 1307 the controlling means 1010 schedules the mobile station MS1 to perform actions other than receiving radio signals carrying the monitored control channel CC1.

After the predicted second point in time 1308, the message receiving means 1401 is arranged for receiving all overhead messages in each consecutive frame until the fourth registration ID message RMSG4 has been received. The message processing means 1402 is arranged for extracting the fourth REGID-value RVAL4 from the received fourth registration ID message RMSG4. The decision means 1411 is arranged for deciding, based on the extracted fourth REGID-value and the expected REGID-value, whether said predicted first point in time 1306 must be adjusted.

If the decision means 1411 decides that there is no need to adjust said predicted first point in time 1306, the mobile station MS2 once more starts ignoring overhead message trains, as previously described, until the predicted first point in time 1306. After the predicted first point in time 1306, the message receiving means 1401 is arranged for receiving all overhead messages in each consecutive frame until the third registration ID message RMSG3 has been received.

Figure 13C:
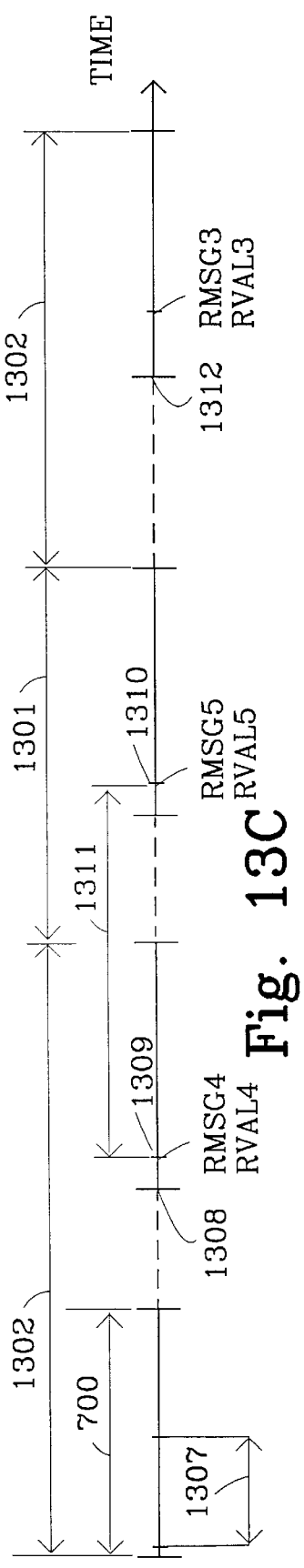

If the decision means 1411 decides that the extracted fourth REGID-value RVAL4 and the expected REGID-value differs to an extent that said predicted first point in time 1306 must be adjusted, the mobile station MS2 reenters the initialization subphase 1301 as illustrated in FIG. 13C. The mobile station MS2 however, needs only receive one additional registration ID message in order to perform this adjustment. The message receiving means 1401 and message processing means 1402 are arranged for receiving a fifth registration ID message RMSG5 having a fifth REGID-value RVAL5 and extracting the fifth REGID-value RVAL5 from the fifth registration ID message RMSG5. The estimating means 1404 is arranged for providing a second estimate 1311 of the interval between consecutive registration ID messages based on time of reception 1309 of the fourth registration ID message RMSG4 and time of reception 1310 of the fifth registration ID messages RMSG5. The predicting means 1405 is arranged for adjusting said predicted first point in time 1312 based on the second interval estimate and the REGID-values RVAL4, RVAL5 extracted from the fourth and the fifth registration ID-messages RMSG4, RMSG5.

By not only trying to receive the registration ID message expected to trigger a registration access, but also one or more intermediate registration ID messages, the mobile station MS2 can more accurately respond if the network NET1 for some reason decides to change the time period between each registration access.

Figure 15A:
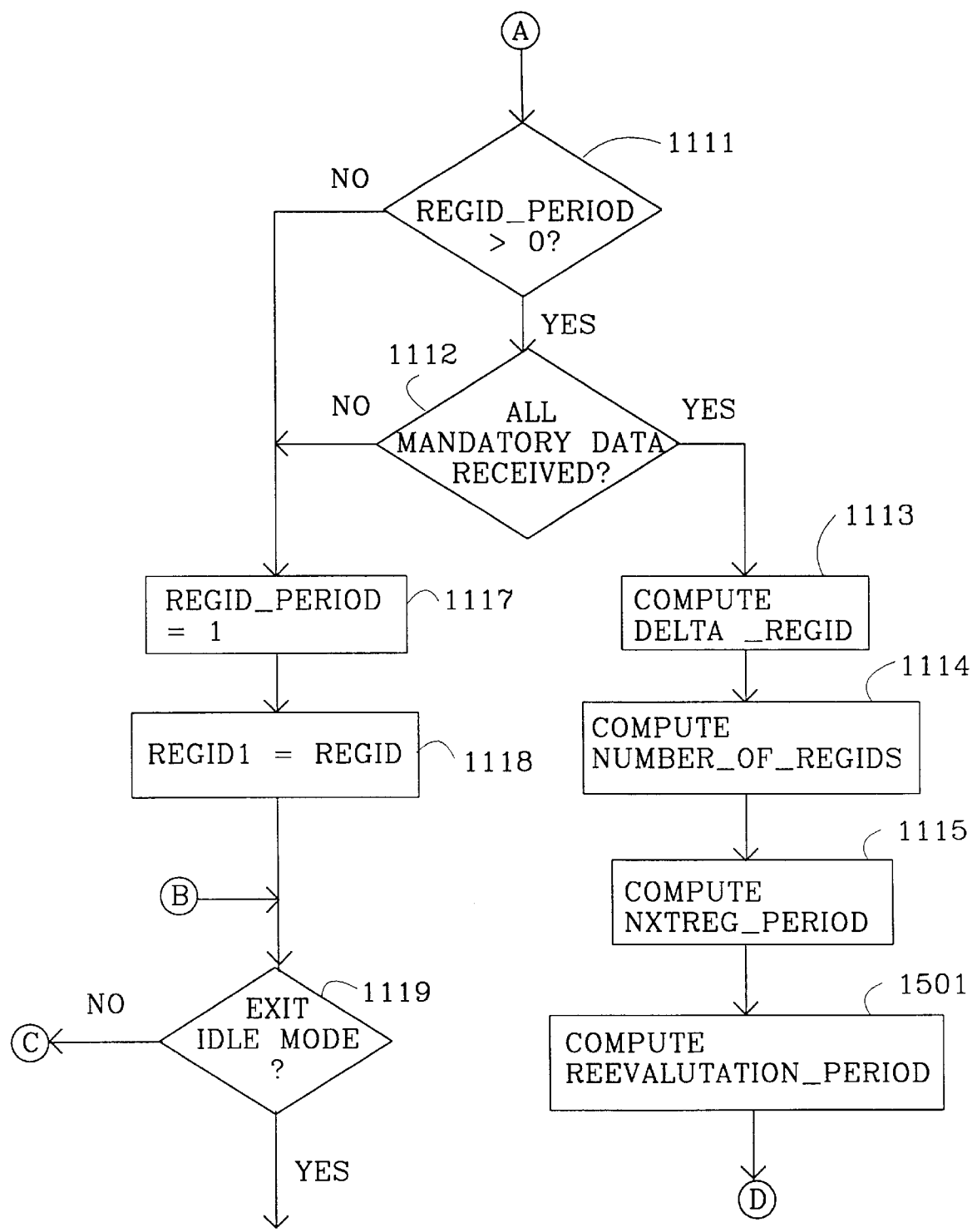
FIGS. 15A–15B contains flow charts illustrating modifications necessary to the flow charts of FIG. 11B and FIG. 11D in order to describe the idle mode operation of the mobile station in FIG. 14.
Figure 15B:
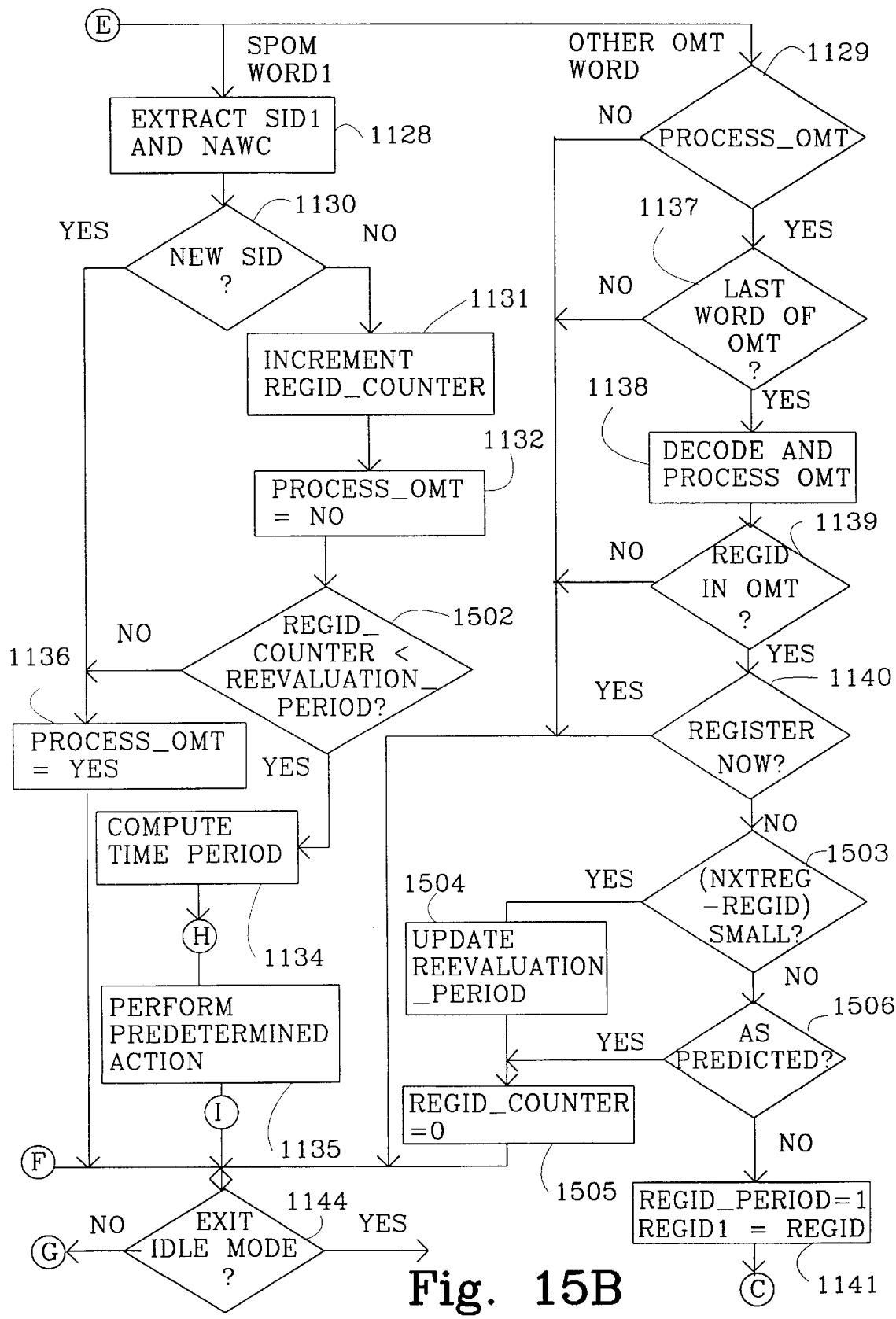

The flowcharts of FIGS. 15A–15B illustrates the modifications necessary to the flowcharts of FIG. 11B and FIG. 11D in order to describe the idle mode operation of the dual mode PCS1900/AMPS mobile station MS2 according to the second embodiment of the invention.

In FIG. 15A a new step 1501 has been added after step 1115. At step 1501 a variable REEVALUATION_PERIOD is determined. The REEVALUATION_PERIOD is determined by dividing the value of the NXTREG_PERIOD variable with the desired number of intermediate reevaluations plus one. For example if one intermediate reevaluation is desired, the REEVALUATION_PERIOD value is determined to be half of the NXTREG_PERIOD value. After step 1501 processing continues at step 1123 in FIG. 11C.

In FIG. 15B, step 1133 in FIG. 11D has been replaced with a new step 1502. The difference between the two steps is that at the new step 1502 a check is made whether the REGID_COUNTER value is less than the REEVALUATION_PERIOD value while at step 1133 in FIG. 11D the REGID_COUNTER value is compared to the NXTREG_PERIOD. Processing continues after the new step 1502 in the same way as after step 1133.

After step 1140 a new step 1503 has been added. When step 1503 is entered, a registration ID message that did not trigger the mobile station MS2 to register with the network NET1 has been received. A check is made at step 1503 to determine whether the difference between the NXTREG threshold value and the just received REGID-value is to be considered as small, i.e. below a certain predetermined threshold.

If the test at step 1503 results in an alternative "YES", implying that a registration ID message triggering the mobile station MS2 to register with the network NET1 is going to occur in the fairly near future, the REEVALUATION_PERIOD variable is updated at step 1504 according to the latest estimate, i.e. using the latest determined DELTA_REGID and REGID_PERIOD values, for when the registration ID message triggering the mobile station MS2 to register will occur. At step 1505 the REGID_COUNTER variable is reset to zero and processing then continues at step 1144.

If the test at step 1503 results in an alternative "NO" implying that a registration ID message triggering the mobile station MS2 to register with the network NET1 is still rather far away, a check is made at a new step 1506 to determine whether the received registration ID message is an intermediate registration ID message received as predicted. If the test at step 1506 results in an alternative "YES", the REGID_COUNTER variable is reset to zero at step 1505 and processing then continues at step 1144. If the test at step 1506 results in an alternative "NO", the mobile station MS2 must adjust its prediction for when a registration ID message triggering the mobile station MS2 to register is expected. At step 1141 the REGID_PERIOD variable is set to one and the REGID1 variable is set equal to the just received REGID-value before the initialization subphase is reentered at step 1101 in FIG. 11A. The actions performed at step 1141 means that the mobile station MS2 needs only to receive one additional registration ID message before once more entering the operation phase of idle mode.

Figure 16:
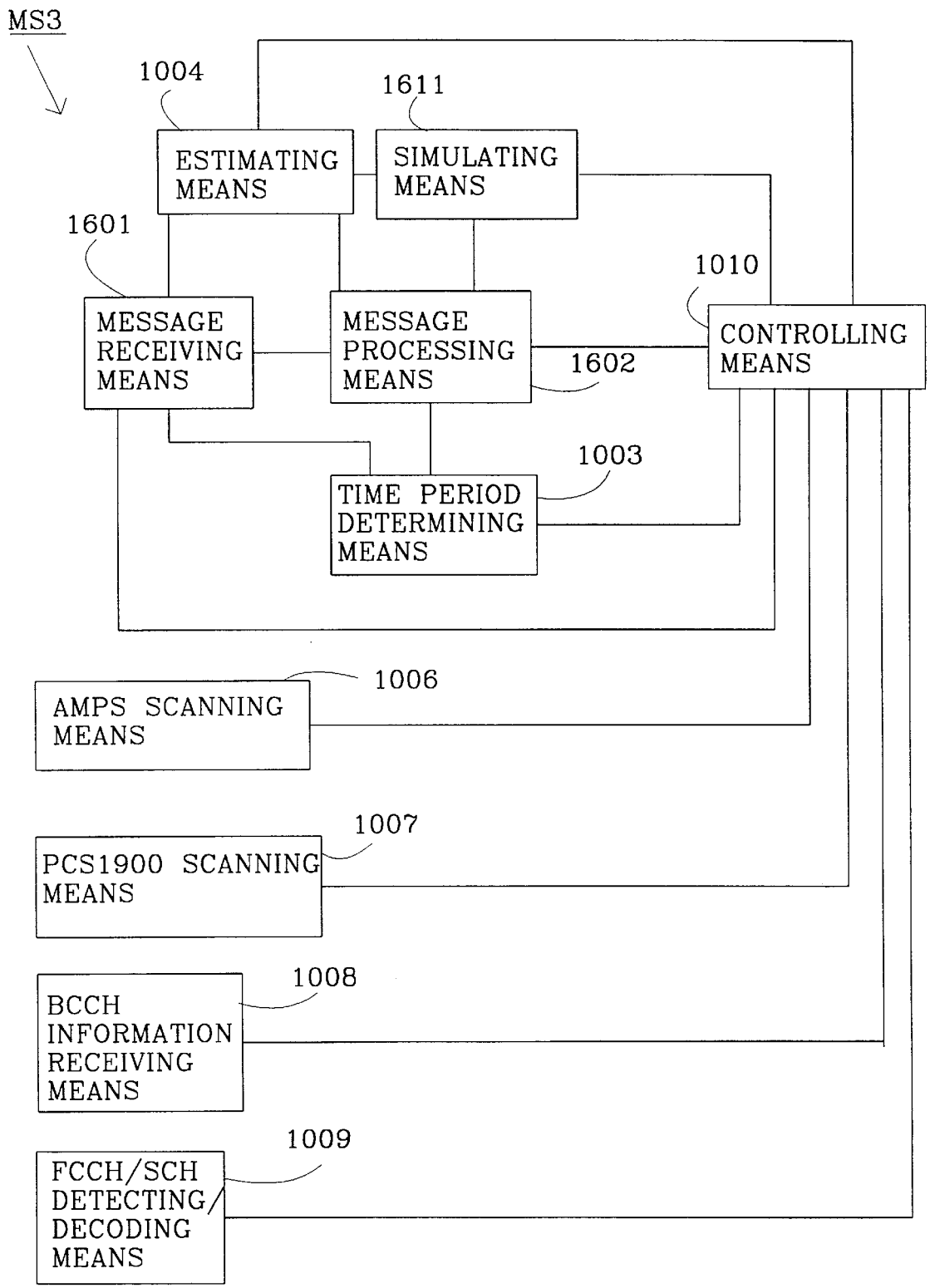
FIG. 16 is a functional block diagram of a mobile station in accordance with a third embodiment of the invention.

FIG. 16 shows a functional block diagram of a dual mode PCS1900/AMPS mobile station MS3 comprising a third embodiment of the invention. This third embodiment can also be derived from the first embodiment of the invention, and will be described in terms of the differences as compared to the first embodiment.

The mobile station MS3 comprises some function blocks 1003–1004, 1006–1010 which are identical in both the first and the third embodiments of the invention. The mobile station MS3 further comprises function blocks 1601 and 1602 which performs a subset of the tasks performed by the corresponding function blocks 1001 and 1002 in the first embodiment of the invention. The mobile station MS3 also comprises an additional function block simulating means 1611.

The mobile station MS3 operates during an initialization phase of idle mode in basically the same way as in the first embodiment of the invention. After, as illustrated in FIG. 13A, receiving the second registration ID message RMSG2, the simulating means 1611 is arranged for initializing a variable REGID_SIM to the REGID-field value RVAL2 received in the second registration ID message RMSG2. The simulating means 1611 also determines the difference between the REGID-field values REGID2 and REGID1 received in the second and the first registration ID messages respectively.

After completing the initialization phase, the mobile station MS3 enters the operation phase 1302 of idle mode.

During the operation phase 1302, the message receiving means 1601 is arranged for receiving the first SPOM word in each frame 700. The message processing means 1602 processes each of said received words and identifies each word. Each time the message processing means 1602 identifies a word as being the first word of a SPOM message, the message processing means 1602 extracts a NAWC-field from the word. The time period determining means 1003 determines a free time period 1307 as lasting until a message following the transmission of a number of words as indicated by the extracted NAWC-field value is expected. During the determined free time period 1307 the controlling means 1010 schedules the mobile station MS1 to perform actions other than receiving radio signals carrying the monitored control channel CC1.

At intervals, approximately corresponding to the estimated interval between consecutive registration ID messages, the simulating means 1611 simulates reception of an registration ID message by incrementing the REGID_SIM variable with a value corresponding to the difference between the received REGID-field values REGID2 and REGID1.

Figure 17A:
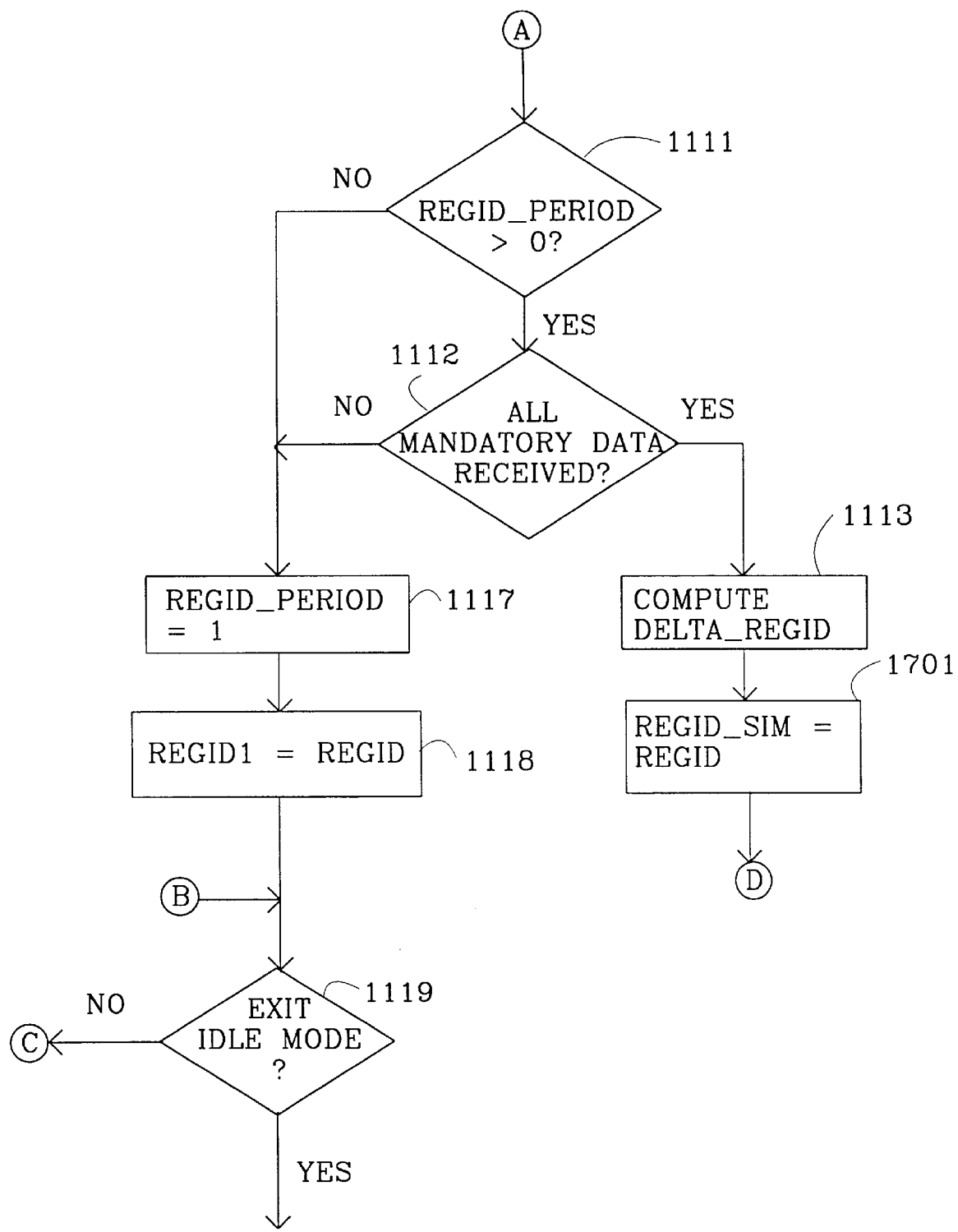
FIGS. 17A–17B contains flow charts illustrating modifications necessary to the flow charts of FIG. 11B and FIG. 11D in order to describe the idle mode operation of the mobile station in FIG. 16.
Figure 17B:
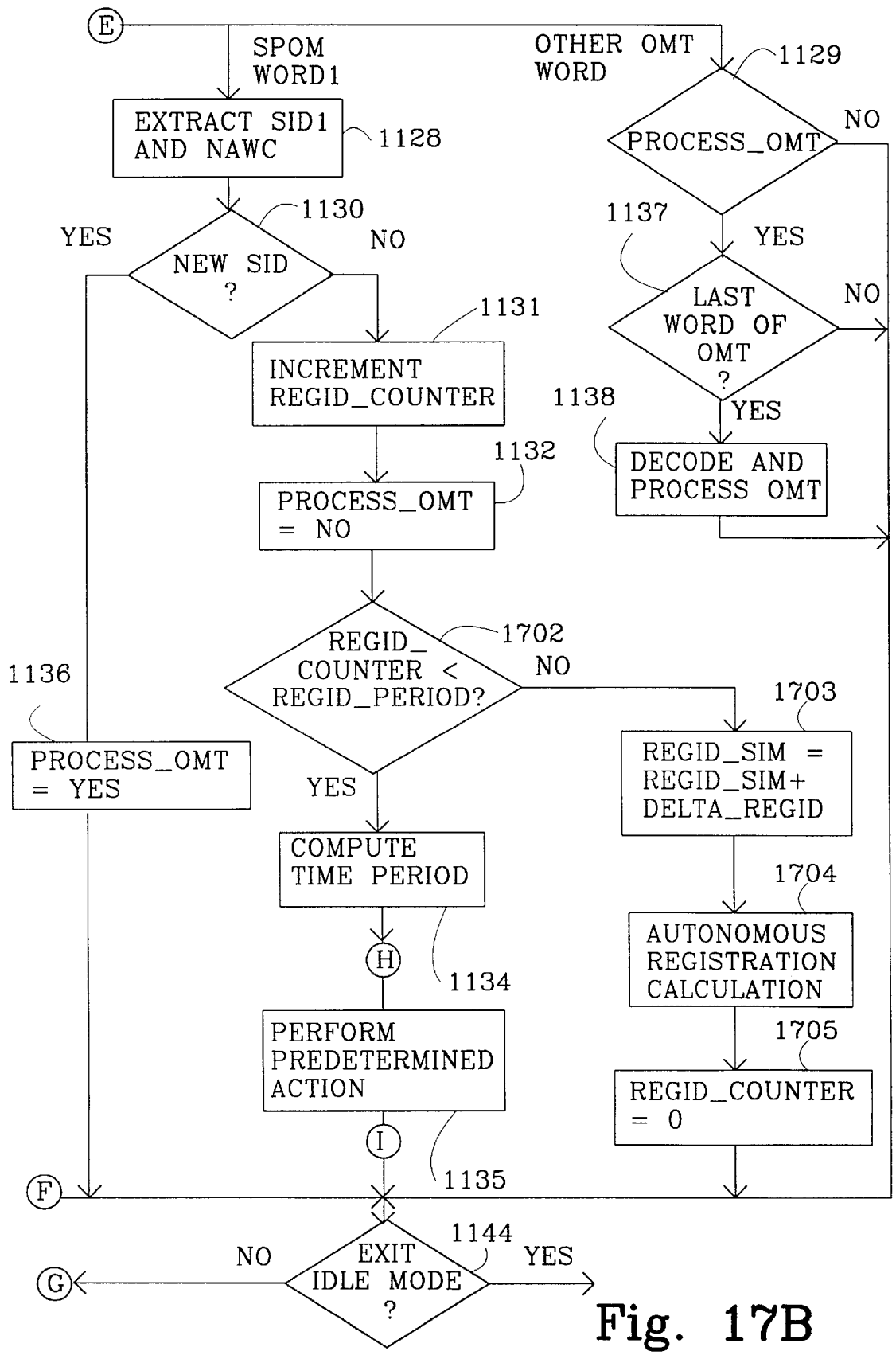

The flowcharts of FIGS. 17A–17B illustrates the modifications necessary to the flowcharts of FIG. 11B and FIG. 11D in order to describe the idle mode operation of the dual mode PCS1900/AMPS mobile station MS3 according to the third embodiment of the invention.

In FIG. 17A steps 1114 and 1115 has been removed. Instead a new step 1701 has been added after step 1113. At step 1701, the variable REGID_SIM is initialized to the just received REGID value. After step 1701 processing continues at step 1123 in FIG. 11C.

In FIG. 17B step 1133 has been replaced by a new step 1702. At step 1702 a check is made whether REGID_COUNTER is less than REGID_PERIOD. If the check at step 1702 results in an alternative "YES", processing continues at step 1134 and continues as in FIG. 11D. If the check at step 1702 results in an alternative "NO", implying that it is now time to simulate reception of a registration ID message, processing continues at at a new step 1703. At step 1703, the REGID_SIM variable is incremented with the DELTA_REGID value. At a new step 1704 an autonomous registration calculation is performed using the value of the REGID_SIM variable instead of a REGID_value actually received in a registration ID message. At a new step 1705 the REGID_Counter variable is reset to zero after which processing continues at step 1144.

Since in this embodiment the reception of registration ID messages are only simulated in the operation phase of idle mode, steps 1139–1141 in FIG. 11D has been removed. Instead, after a received overhead message train has been processed at step 1138, processing continues directly with step 1144. One of the possible reasons why the mobile station MS3 may decide to leave idle mode at step 1144, is that the autonomous registration calculation performed at step 1704, based on the REGID_SIM value, may have indicated that it is time to register with the network NET1.

Scheduling of the free time periods is performed in the same way for all three embodiments of the invention described above, i.e FIGS. 12A–12D provide an adequate illustration of how the mobile stations MS1-MS2 operates during a free time period.

Also, the same hardware is used for all three embodiments of the invention, i.e. FIGS. 8A–8B provide an adequate illustration of the hardware structure of the mobile stations MS1-MS3.

The embodiments of the invention described above are just examples on how the invention may be implemented. There are numerous ways in which the invention may be varied.

An example of yet another embodiment of the invention would be to modify the previously described third embodiment of the invention so that a mobile station, instead of simulating reception of registration ID messages, would try and actually receive registration ID messages at intervals corresponding to an estimate of the interval between two consecutive registration ID messages.

The activities performed during free time periods by a dual mode AMPS/PCS1900 mobile station according to the invention, can of course be varied in numerous different ways. A mobile station may e.g. elect to exit AMPS idle mode once a sufficient strong radio signal on a BCCH-carrier frequency has been received, without performing FCCH/SCH-detection and decoding or elect to exit AMPS idle mode after performing FCCH/SCH-detection and decoding but before any BCCH information has been received. The mobile station may also e.g. elect to use the free time periods exclusively for power saving or exclusively to scan for PCS1900 channels.

One alternative strategy for determining the free time periods is to, once one complete system parameter overhead message has been received, ignore the second word of system parameter overhead message in every frame. This means that each free time period would be determined as lasting until a message following the system parameter overhead message is expected.

It is worth noting that the overhead message trains in any single frame can be skipped directly without any special precautions to compensate for possible loss of information. The reason why the idle mode operation for the three described embodiments of the invention contains an initialization phase during which information is gathered before entering an operation phase is the desire to ignore as many overhead message trains as possible during idle mode, while still being able to support the autonomnous registration function. If not so many overhead message trains need to be ignored, e.g. if the invention is used only to scan for AMPS control channels every 10 minutes, these overhead message trains can be ignored without any special precautions to compensate for possible information loss.

The invention can be applied in other types of mobile stations than dual mode PCS1900/AMPS mobile stations. The invention can of course be used in other kinds of dual mode or multi mode mobile stations, e.g. an AMPS/IS-95 dual mode mobile station, or for AMPS single mode mobile station.

The invention is also applicable to single mode or multimode mobile stations that may operate in a TACS network, since the TACS standard is derived from the AMPS standard and the structure of the TACS forward control channel is identical with the AMPS forward control channel in all aspects important to the invention. The descriptions used to illustrate three different embodiments of PCS1900/AMPS mobile stations, can equally well serve to illustrate how a GSM/TACS mobile station could be implemented.

What is claimed is:

1. A method for scheduling operation of a mobile station (MS1) in a radio communication system, the mobile station (MS1) being in standby mode monitoring a first control channel (CC1) on which a first base station (BS1) in a first radio communication network (NET1) in the system continuously transmits messages (703–708), each message comprising at least one word of information bits (40), messages potentially of concern to the mobile station (MS1) being transmitted on the first control channel (CC1) in periodic occurring frames (700), each frame comprising a first sequence of messages (701) in which no message is addressed to a specific mobile station monitoring the first control channel (CC1), the method comprising the steps of for at least a first of the frames:

(a) computing (1134) a time period (1307), according to a predetermined formula based on the extent of the first message sequence (701), during which time period (1307) all transmitted words (703–706) belong to messages in the first sequence of messages (701) in the first frame (700);

(b) performing (1135) a predetermined action, other than receiving radio signals carrying the first control channel (CC1), during the determined time period (1307).

2. A method according to claim 1 wherein the method further comprises the steps of:

(c) receiving (1124) in said mobile station (MS1) at least one word of information bits (703) belonging to a message in the first sequence of messages (701);

(d) identifying (1125) the received word (703) as belonging to an initial message (703–704) in the first sequence of messages (701);

wherein said step (a) is performed after completion of step (d).

3. A method according to claim 1 wherein said monitored control channel (CC1) being an AMPS Forward Control Channel, said first sequence of messages consisting of overhead messages (703–706), said received at least one word of information bits (703) being a first word of a system parameter overhead message (703–704).

4. A method according to claim 1 wherein said monitored control channel (CC1) being an AMPS Forward Control Channel, said first sequence of messages consisting of overhead messages (703–706) and control-filler messages (708), said received at least one word of information bits (703) being a first word of a system parameter overhead message (703–704).

5. A method according to claim 1 wherein said monitored control channel (CC1) being a TACS Forward Control Channel, said first sequence of messages consisting of overhead messages (703–706), said received at least one word of information bits (703) being a first word of a system parameter overhead message (703–704).

6. A method according to claim 1 wherein said monitored control channel (CC1) being a TACS Forward Control Channel, said first sequence of messages consisting of overhead messages (703–706) and control-filler messages (708), said received at least one word of information bits (703) being a first word of a system parameter overhead message (703–704).

7. A method according to claim 3 wherein said time period (1307) is determined in step (a) as lasting until receipt of a message (705) following the system parameter overhead message is expected.

8. A method according to claim 3 wherein said time period is determined in step (a) as lasting at longest until a message (707) following the transmission of a number of words as indicated by a NAWC-field (903) of said received first word (703) of the system parameter overhead message (703–704) is expected.

9. A method according to claim 3 wherein the method further comprises the steps of:

(g) receiving (1102) a first registration ID message (RMSG1) having a first REGID-field value (RVAL1) and a second registration ID message (RMSG2) having a second REGID-field value (RVAL2), the first and second registration ID messages (RMSG1, RMSG2) being consecutive registration ID messages;

(h) estimating (1101, 1109–1111, 1113, 1117), based on time of reception (1303) of the first registration ID message (RMSG1) and time of reception (1304) of the second registration ID message (RMSG2), an interval (1305) between consecutive registration ID messages;

(i) predicting (1114–1115), based on the estimated interval (1305), a first point in time (1306) before a third registration ID message (RMSG3) is expected;

(j) receiving (1124), from the predicted first point in time (1306), all messages (703–706) in the first message sequence (701) in each consecutive frame (700) until the third registration ID message (RMSG3) having a third REGID-value (RVAL3) has been received.

10. A method according to claim 9 wherein said third registration ID message (RMSG3) is a registration ID message which is expected to trigger said mobile station (MS1) to next register with said first radio communication network (NET1) and that said prediction in step (i) is based on both said estimated interval (1305) and said REGID-field values (RVAL1, RVAL2) of said first and second registration ID messages (RMSG1, RMSG2).

11. A method according to claim 10 wherein the method further comprises the steps of:

(k) predicting (1501) a second point in time (1308), previous to said first point in time (1306), before a fourth registration ID message (RMSG4) is expected;

(l) predicting an expected REGID-value (RVAL4) for the fourth registration ID message (RMSG4);

(m) receiving (1124), from the predicted second point (1308) in time, all messages (703–706) in the first message sequence (701) in each consecutive frame (700) until the fourth registration ID message (RMSG4) having a fourth REGID-value (RVAL4) has been received;

(n) deciding (1503, 1506), based on the received fourth REGID-value and the expected REGID-value, whether said predicted first point (1306) in time must be adjusted and when so decided, repeating steps (g)–(i) with the received fourth registration ID message (RMSG4) used as said first registration ID message in steps (g) and (h).

12. A method according to claim 3 wherein the method further comprises the steps of:

(o) receiving (1102) a first registration ID message (RMSG1) having a first REGID-field value (RVAL1) and a second registration ID message (RMSG2) having a second REGID-field value (RVAL2), the first and second registration ID messages (RMSG1, RMSG2) being consecutive registration ID messages;

(p) initializing (1701) a variable in the mobile station to the value of the second REGID-field (RVAL2);

(q) estimating (1101, 1109–1111, 1113, 1117), based on time of reception (1303) of the first registration ID message (RMSG1) and time of reception (1304) of the second registration ID message (RMSG2), an interval (1305) between consecutive registration ID messages;

(r) simulating (1703–1704), at approximately the intervals determined in step (q), reception of a registration ID message by incrementing (1703) the variable initialized in step (p) with a value corresponding to the difference between the second REGID-field value (RVAL2) and the first REGID-field value (RVAL1).

13. A method according to claim 1 wherein said predetermined action comprises turning off portions of said mobile station (MS1).

14. A method according to claim 1 wherein said predetermined action comprises scanning (1205) for control channels (CC2–CC3) transmitted by other base stations (BS2–BS3) than said first base station (BS1) in said first radio communication network (NET1).

15. A method according to claim 1 wherein said predetermined action comprises scanning (1219) for control channels transmitted by base stations (CC4–CC6) in a second radio communication network (NET2).

16. A method according to claim 15 wherein said second radio communication network (NET2) being of a different type than said first radio communication network (NET1).

17. A method according to claim 1 wherein said predetermined action comprises receiving (1246) information on a second control channel (CC4) transmitted by a second base station (BS4) in a second radio communication network (NET2).

18. A mobile station (MS1) for operation in a radio communication system comprising at least a first radio communication network (NET1), said network comprising at least a first base station (BS1) which on a first control channel (CC1) continuously transmits messages (703–708), each message comprising at least one word of information bits (40), messages potentially of concern to the mobile station (MS1) being transmitted on the first control channel (CC1) in periodic occurring frames (700), each frame (700) comprising a first sequence of messages (701) in which no message is addressed to a specific mobile station monitoring the first control channel (CC1), the mobile station (MS1) comprising:

time period computing means (1003) arranged for computing a time period (1307), for at least a first of the frames (700) occurring when the mobile station (MS1) is operating in standby mode monitoring the first control channel (CC1), using a formula based on the extent of the first message sequence (701), during which time period (1307) all transmitted words (703–706) belong to messages in the first sequence of messages (701);

controlling means (1010) arranged for scheduling the mobile station (MS1) to perform to perform a predetermined action other than receiving radio signals carrying the first control channel (CC1) during the determined time period (1307).

19. A mobile station (MS1) according to claim 18 wherein mobile station (MS1) further comprises:

message receiving means (1001) arranged for receiving at least one word of information bits (703) belonging to a message in said first sequence of messages (701) in said first frame (700);

message processing means (1002) connected to the message receiving means (1001), arranged for identifying the received at least one word (703) as belonging to an initial message (703–704) in said first sequence of messages (701), said time period determining means (1003) being arranged for determining said time period (1307) after identification of the received at least one word (703) as belonging to the initial message (703–704).

20. A mobile station (MS1) according to claim 18 wherein the mobile station (MS1) is capable of operating in an AMPS network (NET1), said monitored control channel (CC1) being an AMPS Forward Control Channel, said first sequence of messages (701) consisting of AMPS overhead messages (703–706), said received at least one word of information bits (703) being a first word of a system parameter overhead message (703–704).

21. A mobile station (MS1) according to claim 18 wherein the mobile station (MS1) is capable of operating in an AMPS network (NET1), said monitored control channel (CC1) being an AMPS Forward Control Channel, said first sequence of messages (701) consisting of AMPS overhead messages (703–706) and control-filler messages (708), said received at least one word of information bits (703) being a first word of a system parameter overhead message (703–704).

22. A mobile station (MS1) according to claim 18 wherein the mobile station (MS1) is capable of operating in a TACS network (NET1), said monitored control channel (CC1) being a TACS Forward Control Channel, said first sequence of messages (701) consisting of TACS overhead messages (703–706), said received at least one word of information bits (703) being a first word of a system parameter overhead message (703–704).

23. A mobile station (MS1) according to claim 18 wherein the mobile station (MS1) is capable of operating in a TACS network (NET1), said monitored control channel (CC1) being a TACS Forward Control Channel, said first sequence of messages (701) consisting of TACS overhead messages (703–706) and control-filler messages (708), said received at least one word of information bits (703) being a first word of a system parameter overhead message (703–704).

24. A mobile station (MS1) according to claim 20 wherein said time period determining means (1003) is arranged to determine said time period (1307) as lasting until receipt of a message (705) following the system parameter overhead message (703–704) is expected.

25. A mobile station (MS1) according to claim 20 wherein said message processing means (1002) is arranged for extracting a NAWC-field (903) of said received first word (703) of the system parameter overhead message (703–704) and that said time period determining means (1003) is arranged for determining said time period as lasting at longest until a message (707), following the transmission of a number of words as indicated by the NAWC-field (903), is expected.

26. A mobile station (MS1) according to claim 20 wherein said message receiving means (1001) is arranged for receiving a first registration ID message (RMSG1) having a first REGID-field value (RVAL1) and a second registration ID message (RMSG2) having a second REGID-field value (RVAL2), the first and second registration ID messages (RMSG1, RMSG2) being consecutive registration ID messages;

that said message processing means (1002) is arranged for extracting the first and second REGID-field values (RVAL1, RVAL2) from the first and second registration ID messages (RMSG1, RMSG2) respectively; and that the mobile station (MS1) further comprises:

estimating means (1004) arranged for estimating, based on time of reception (1303) of the first registration ID message (RMSG1) and time of reception (1304) of the second registration ID messages (RMSG2), an interval (1305) between consecutive registration ID messages;

predicting means (1005) arranged for predicting, based on the estimated interval (1305), a first point in time (1306) before a third registration ID message (RMSG3) is expected, said message receiving means (1001) being arranged for receiving, from the predicted first point in time (1306), all messages in the first message sequence (701) in each consecutive frame (700) until the third registration ID message (RMSG1) having a third REGID-value (RVAL3) has been received.

27. A mobile station (MS1) according to claim 26 wherein that said third registration ID message (RMSG3) is a registration ID message which is expected to trigger the mobile station (MS1) to next register with said first radio communication network (NET1) and that said predicting means (1005) is arranged for predicting said first point in time (1306) based on both said estimated interval (1305) and said first and second extracted REGID-values (RVAL1, RVAL2).

28. A mobile station (MS2) according to claim 27 wherein said predicting means (1405) being arranged for predicting a second point in time (1308), previous to said first point in time (1306), before a fourth registration ID message (RMSG4) is expected and predicting an expected REGID-value (RVAL4) for the fourth registration ID message (RMSG4);

said message receiving means (1401) being arranged for receiving, from the predicted second point in time (1308), all messages (703–706) in the first message sequence (701) in each consecutive frame (700) until the fourth registration ID message (RMSG4) having a fourth REGID-value (RVAL4) has been received, said message processing means (1402) being arranged for extracting the fourth REGID-value (RVAL4) from the fourth registration ID message (RMSG4);

the mobile station (MS2) further comprising:

decision means (1411) arranged for deciding, based on the extracted fourth REGID-value and the expected REGID-value, whether said predicted first point in time (1306) must be adjusted;

and that upon decision by the decision means (1411) that said predicted first point in time (1306) must be adjusted, said message receiving means (1401) and message processing means (1402) being arranged for receiving a fifth registration ID message (RMSG5) having a fifth REGID-value (RVAL5) and extracting the fifth REGID-value (RVAL5) from the fifth registration ID message (RMSG5), said estimating means (1404) being arranged for providing a second estimate of said interval (1311) between consecutive registration ID messages based on time of reception (1309) of the fourth registration ID message and time of reception (1310) of the fifth registration ID message, said predicting means (1405) being arranged for adjusting said predicted first point in time (1312), based on the second interval estimate (1311) and the REGID-values (RVAL4, RVAL5) extracted from the fourth and fifth registration ID-messages (RMSG4, RMSG5).

29. A mobile station (MS3) according to any of the claims 20–25 wherein said message receiving means (1601) is arranged for receiving a first registration ID message (RMSG1) having a first REGID-field value (RVAL1) and a second registration ID message (RMSG2) having a second REGID-field value (RVAL2), the first and second registration ID messages (RMSG1, RMSG2) being consecutive registration ID messages, said message processing means (1602) being arranged for extracting the first and second REGID-field values (RVAL1, RVAL2) from the first and second registration ID messages (RMSG1, RMSG2) respectively, the mobile station (MS3) further comprising:

estimating means (1004) arranged for estimating, based on time of reception of the first and second registration ID messages (RMSG1, RMSG2), an interval (1305) between consecutive registration ID messages;

simulating means (1611) arranged for initializing a variable to the value of the second REGID-field (RVAL2) and simulating, at approximately the estimated intervals (1305), reception of a registration ID message by incrementing the variable with a value corresponding to the difference between the second REGID-field value (RVAL2) and the first REGID-field value (RVAL1).

30. A mobile station (MS1) according to claim 18 wherein said controlling means (1010) is arranged for turning off portions of the mobile station (MS1) during said time period (1307).

31. A mobile station (MS1) according to claim 18 wherein the mobile station further comprises scanning means (1006), said controlling means (1010) scheduling the scanning means (1006) to scan for control channels (CC2–CC3) transmitted by other base stations (BS2–BS3) than said first base station (BS1) in said first radio communication network (NET1) during said time period (1307).

32. A mobile station (MS1) according to any of the claims 18–29 wherein the mobile station (MS1) further comprises scanning means (1007), said controlling means (1010) scheduling the scanning means (1007) to scan for control channels (CC4–CC6) transmitted by base stations (BS4–BS6) in a second radio communication network (NET2) during said time period (1307).

33. A mobile station (MS1) according to claim 32 wherein said second radio communication network (NET2) being of a different type than said first radio communication network (NET1).

34. A mobile station (MS1) according to claim 18 wherein the mobile station (MS1) comprises information receiving means (1008, 1009), said controlling means (1010) scheduling the information receiving means (1008, 1009) for receiving information transmitted on a second control channel (CC4) transmitted by a second base station (BS4) in a second radio communication network (NET2) during said time period (1307).

* * * * *